Jan. 13, 1942.  G. ROESSLER  2,269,553
GLASS MACHINE AND METHOD OF MAKING GLASS
Filed Oct. 8, 1936  17 Sheets-Sheet 1
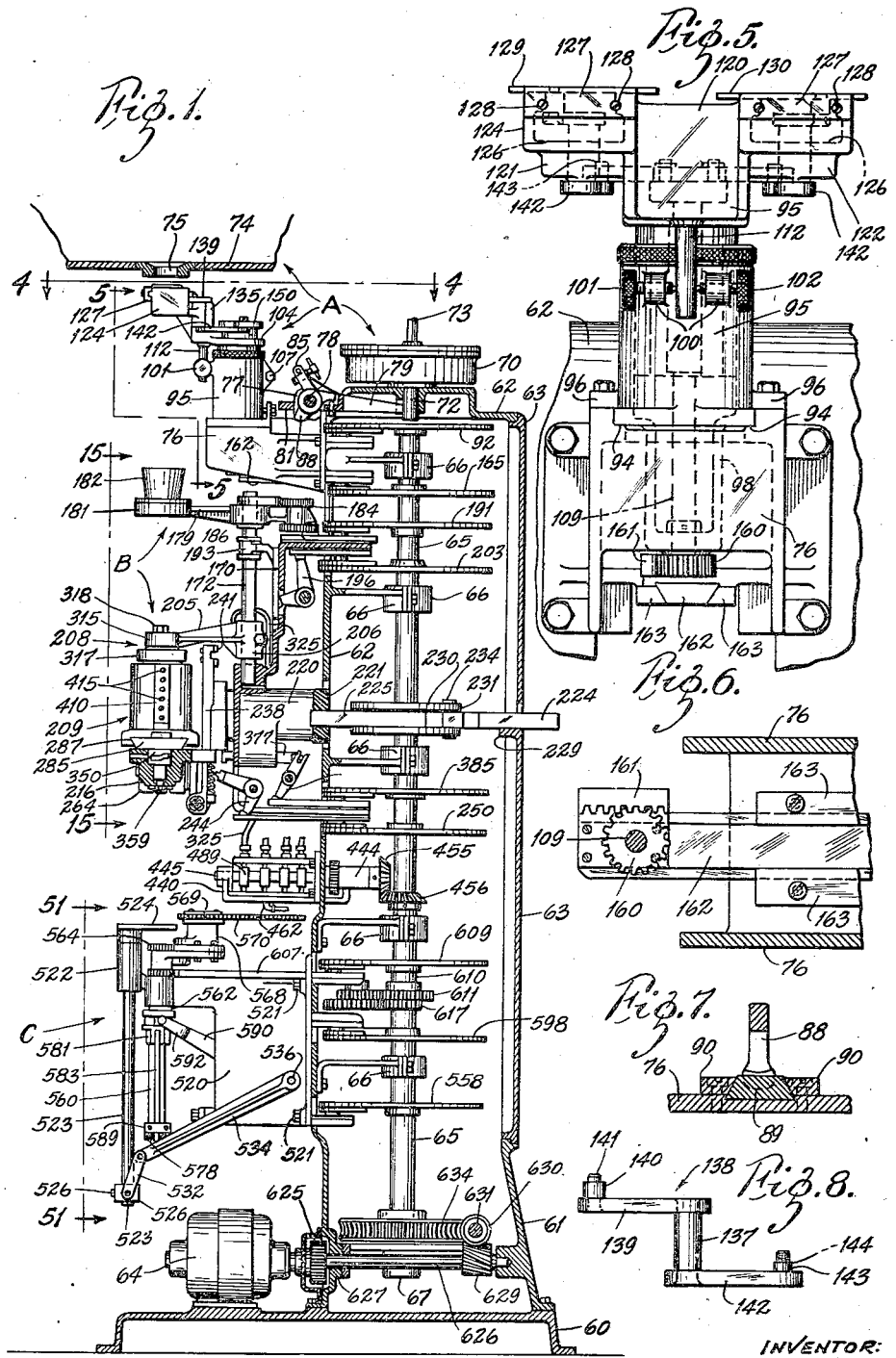
INVENTOR:
GEORGE ROESSLER,
By Lawrence C. Kingsland
ATTORNEY.

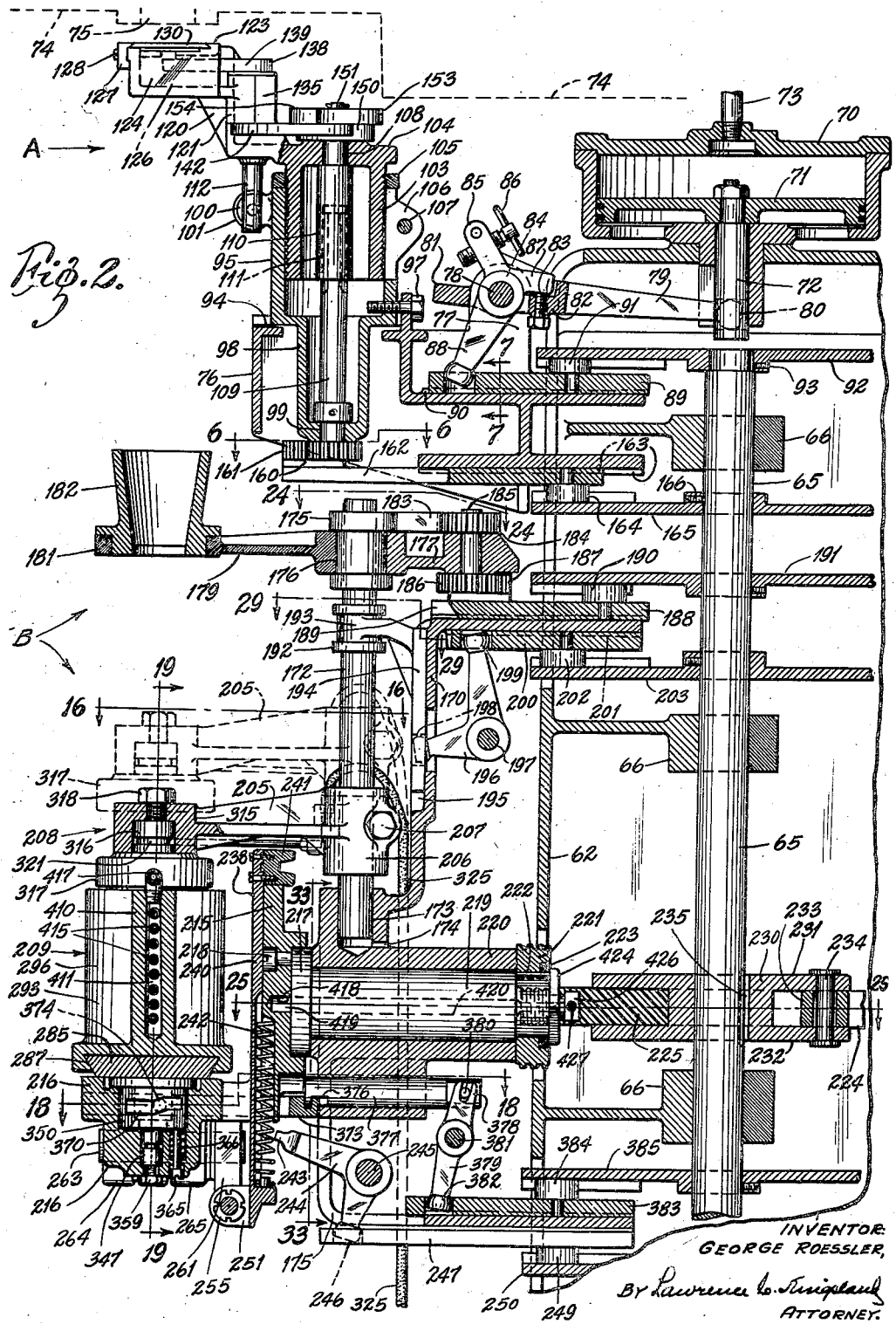

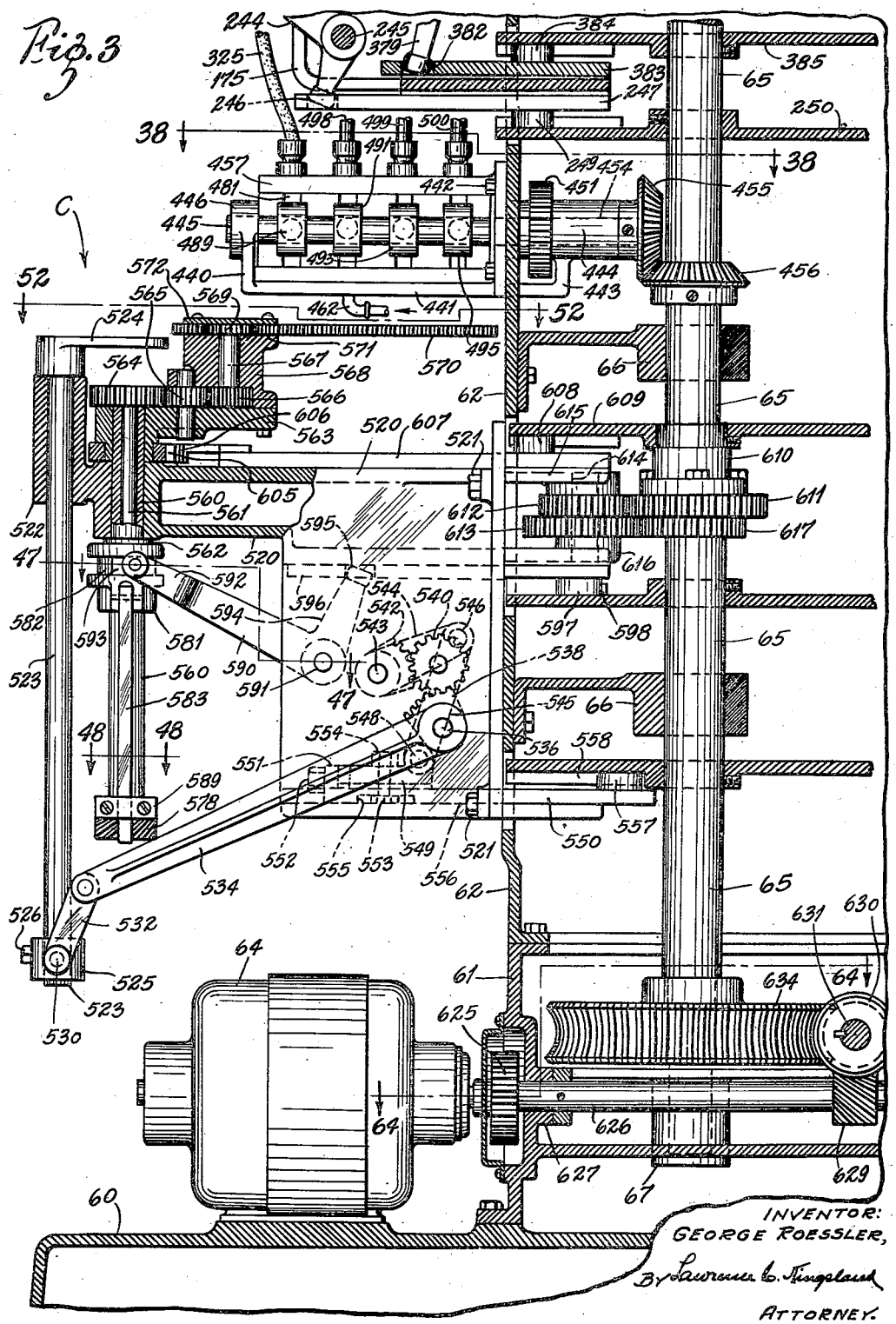

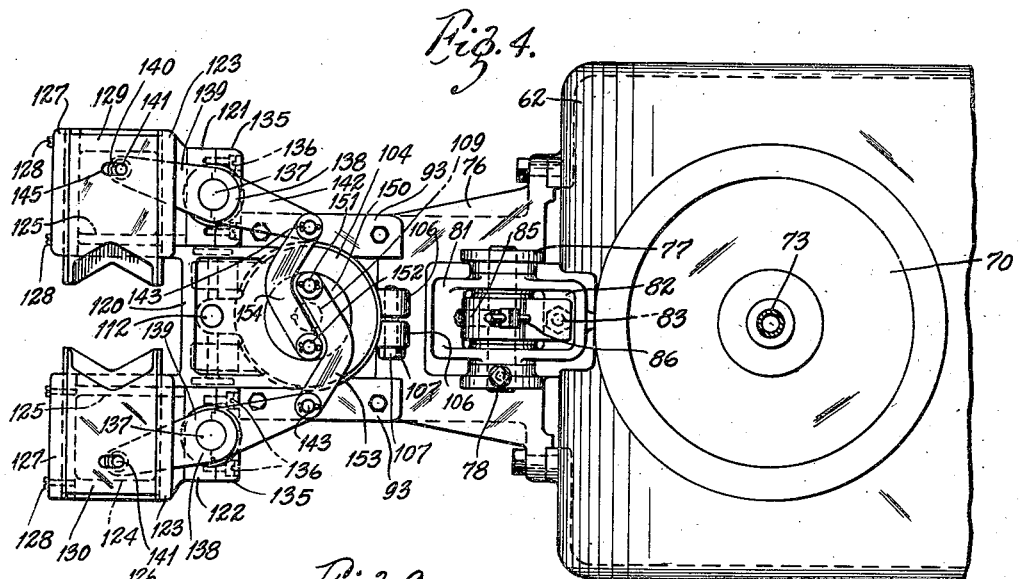
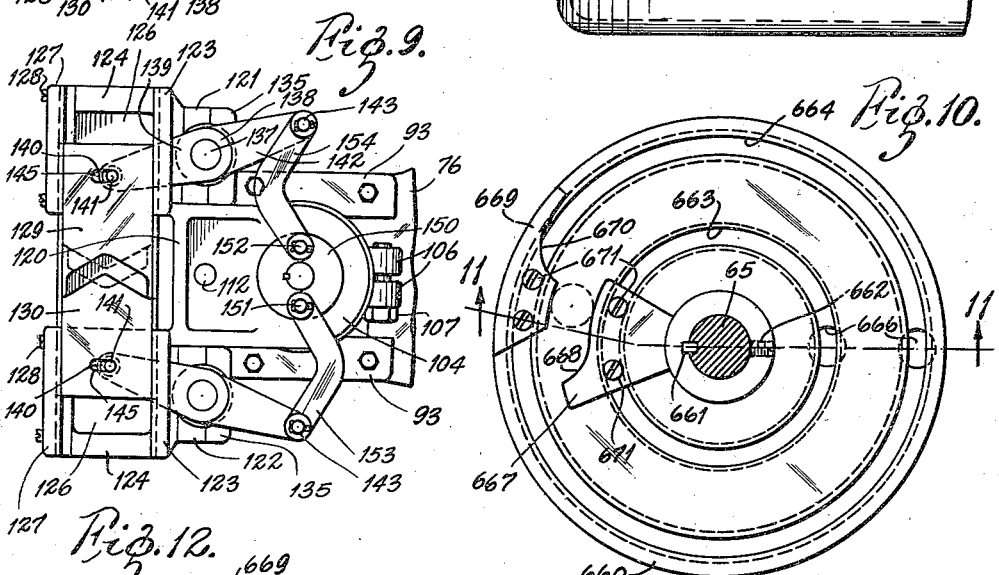
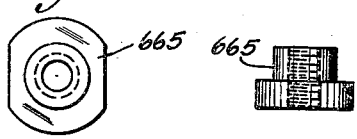
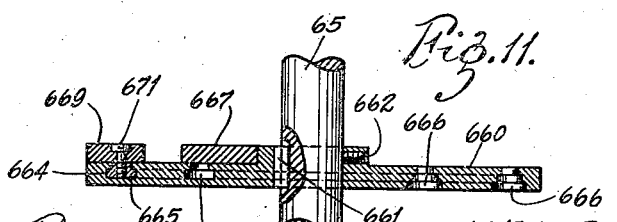

Jan. 13, 1942.  G. ROESSLER  2,269,553
GLASS MACHINE AND METHOD OF MAKING GLASS
Filed Oct. 8, 1936  17 Sheets-Sheet 5

INVENTOR:
GEORGE ROESSLER,
By Lawrence C. Kingsland
ATTORNEY

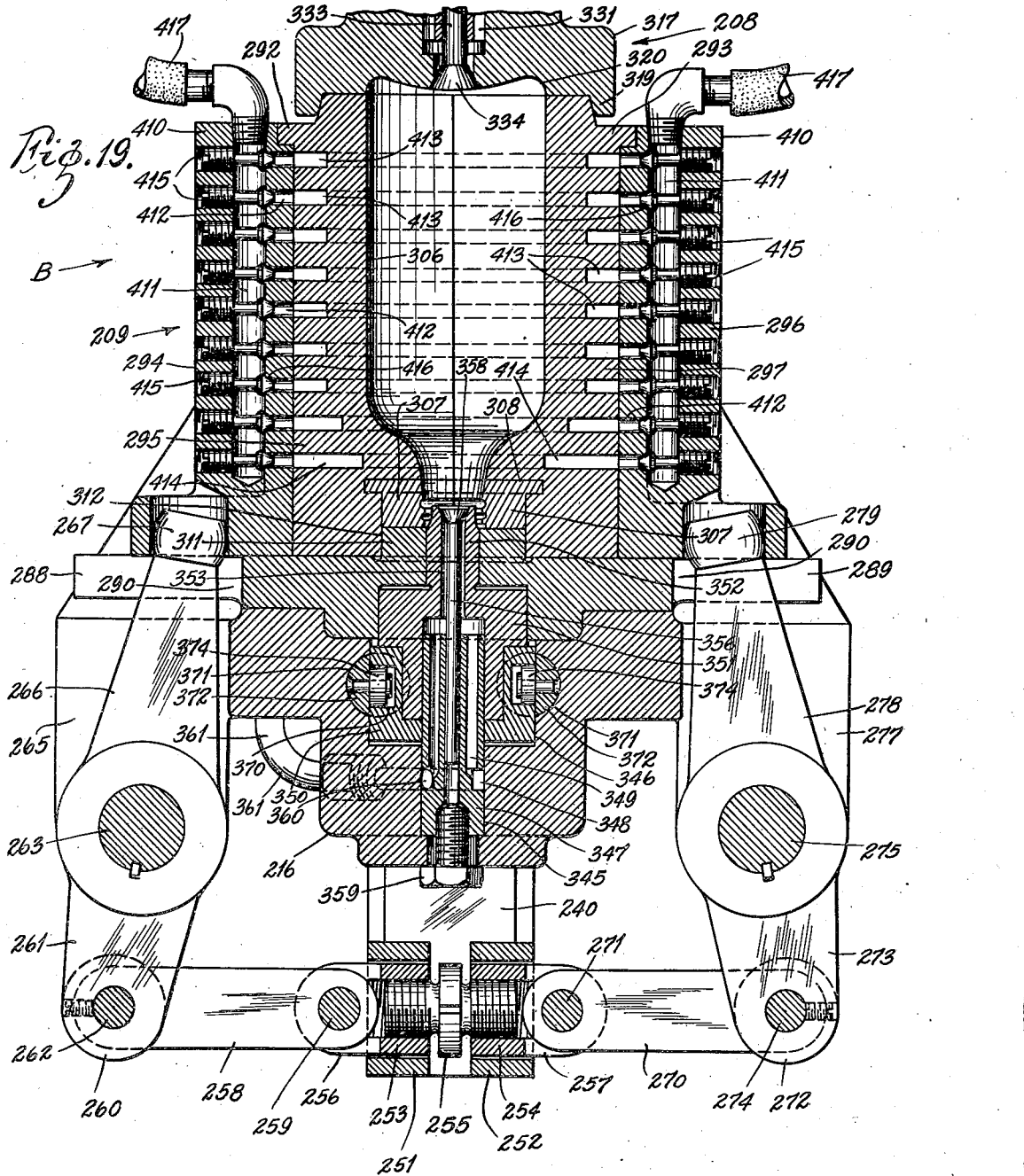

Jan. 13, 1942.　　　G. ROESSLER　　　2,269,553
GLASS MACHINE AND METHOD OF MAKING GLASS
Filed Oct. 8, 1936　　　17 Sheets-Sheet 7
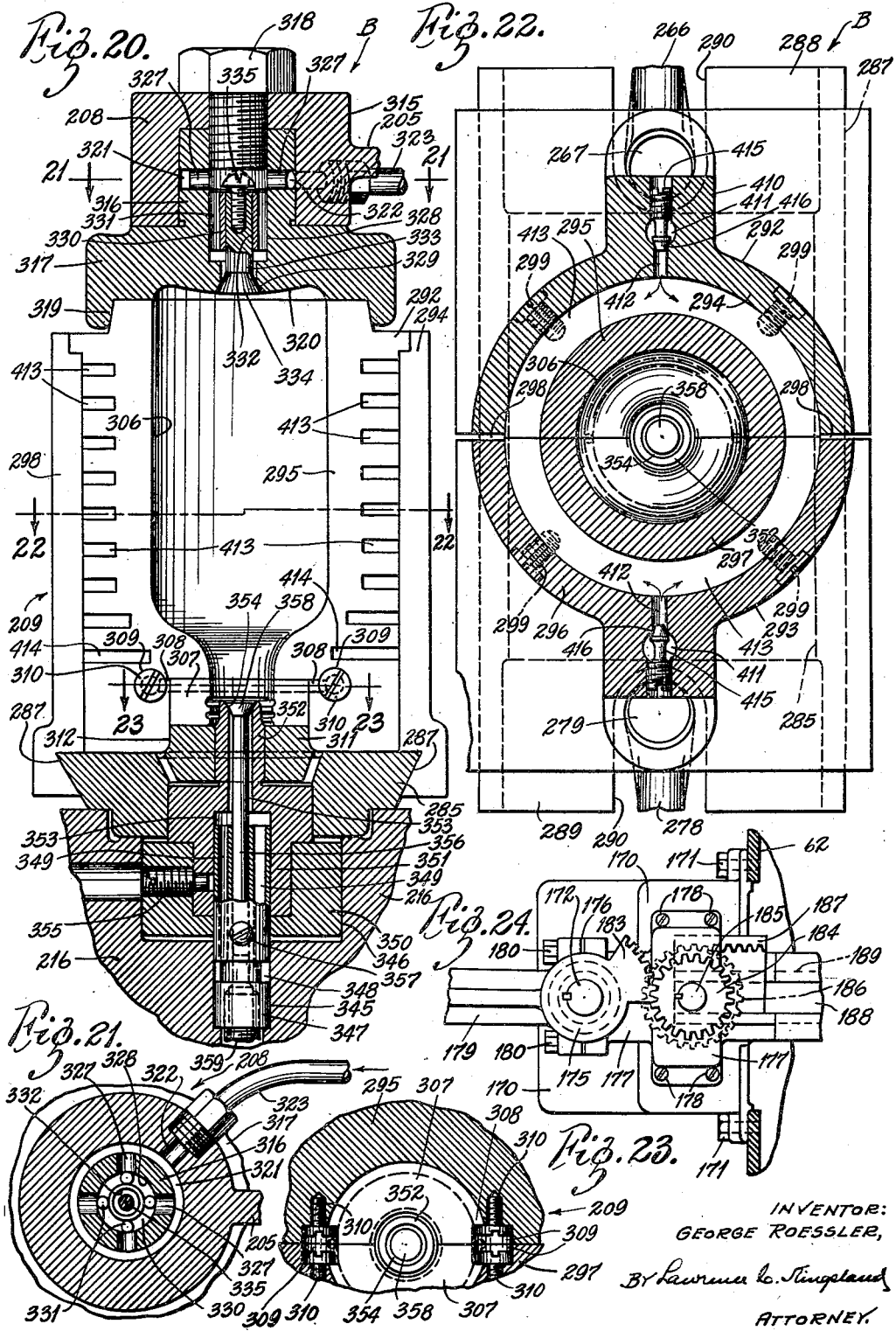
INVENTOR:
GEORGE ROESSLER,
By Lawrence C. Kingsland
ATTORNEY.

Jan. 13, 1942.   G. ROESSLER   2,269,553
GLASS MACHINE AND METHOD OF MAKING GLASS
Filed Oct. 8, 1936   17 Sheets-Sheet 8
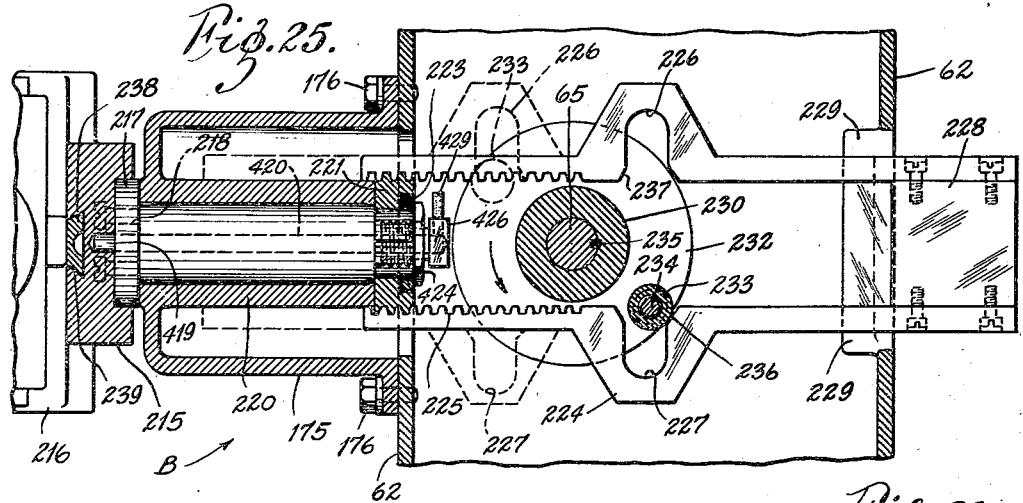
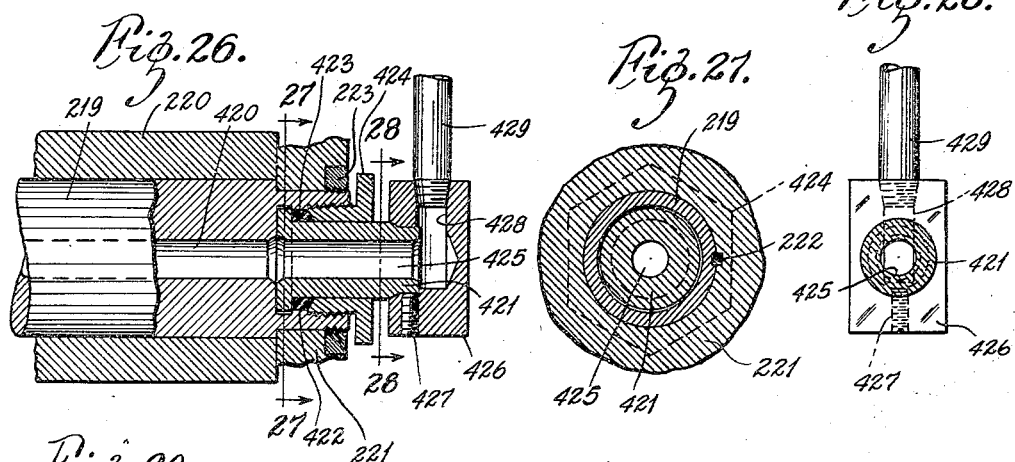
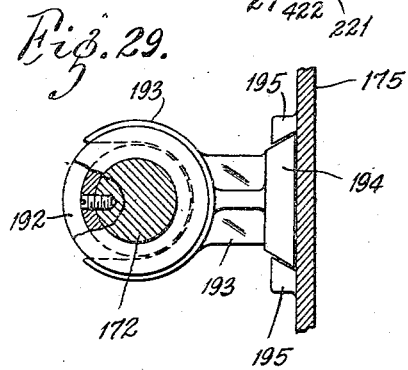
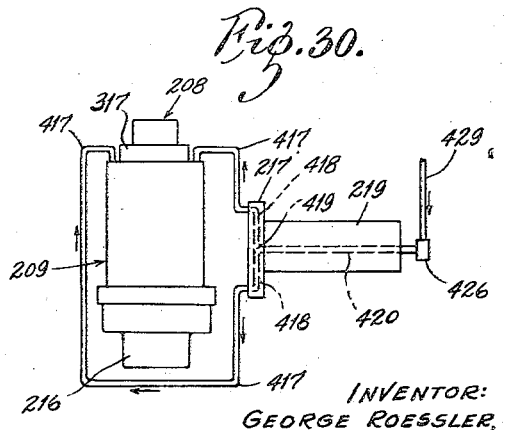
INVENTOR:
GEORGE ROESSLER,
By Lawrence C. Kingsland
ATTORNEY.

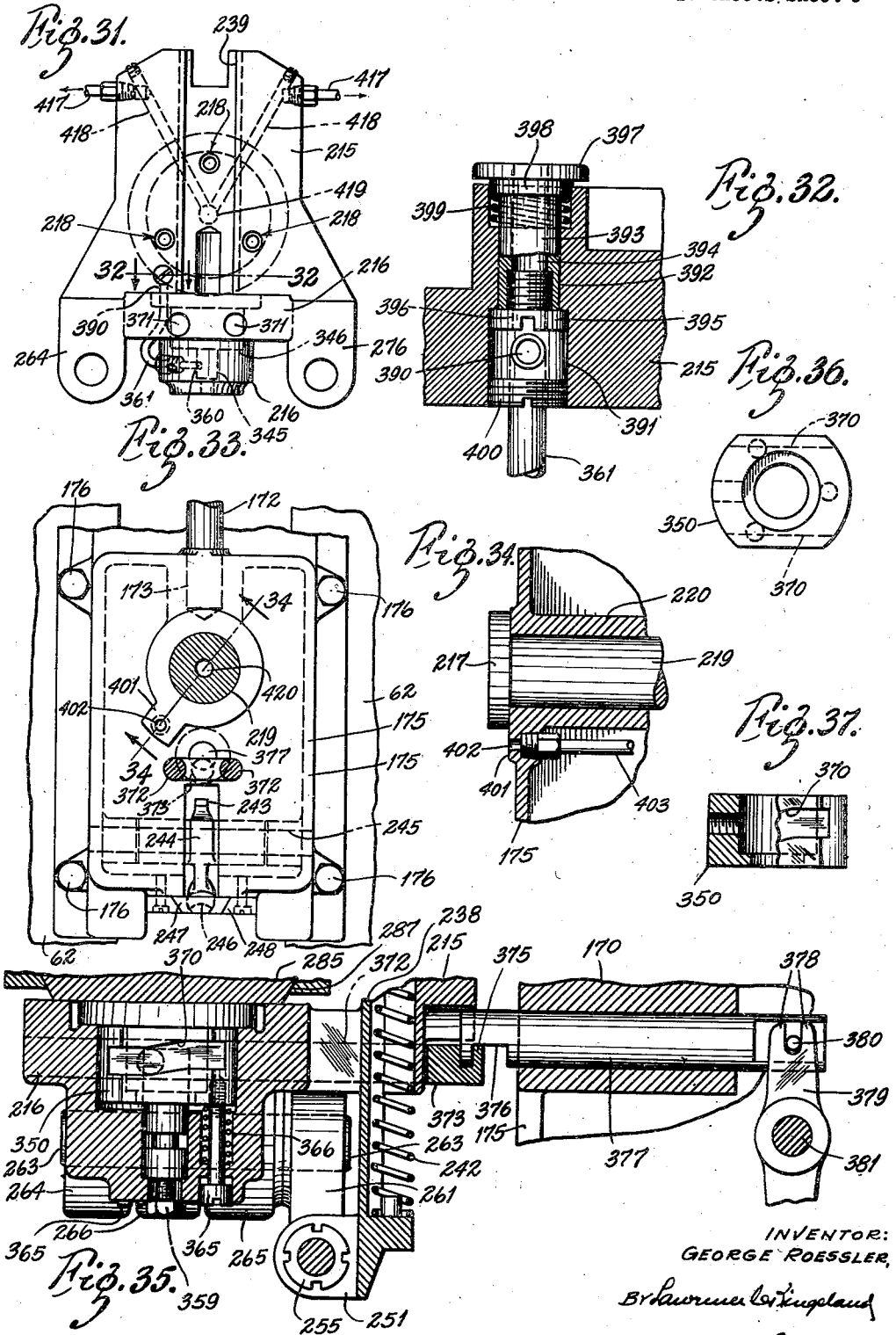

Jan. 13, 1942.  G. ROESSLER  2,269,553
GLASS MACHINE AND METHOD OF MAKING GLASS
Filed Oct. 8, 1936  17 Sheets-Sheet 10
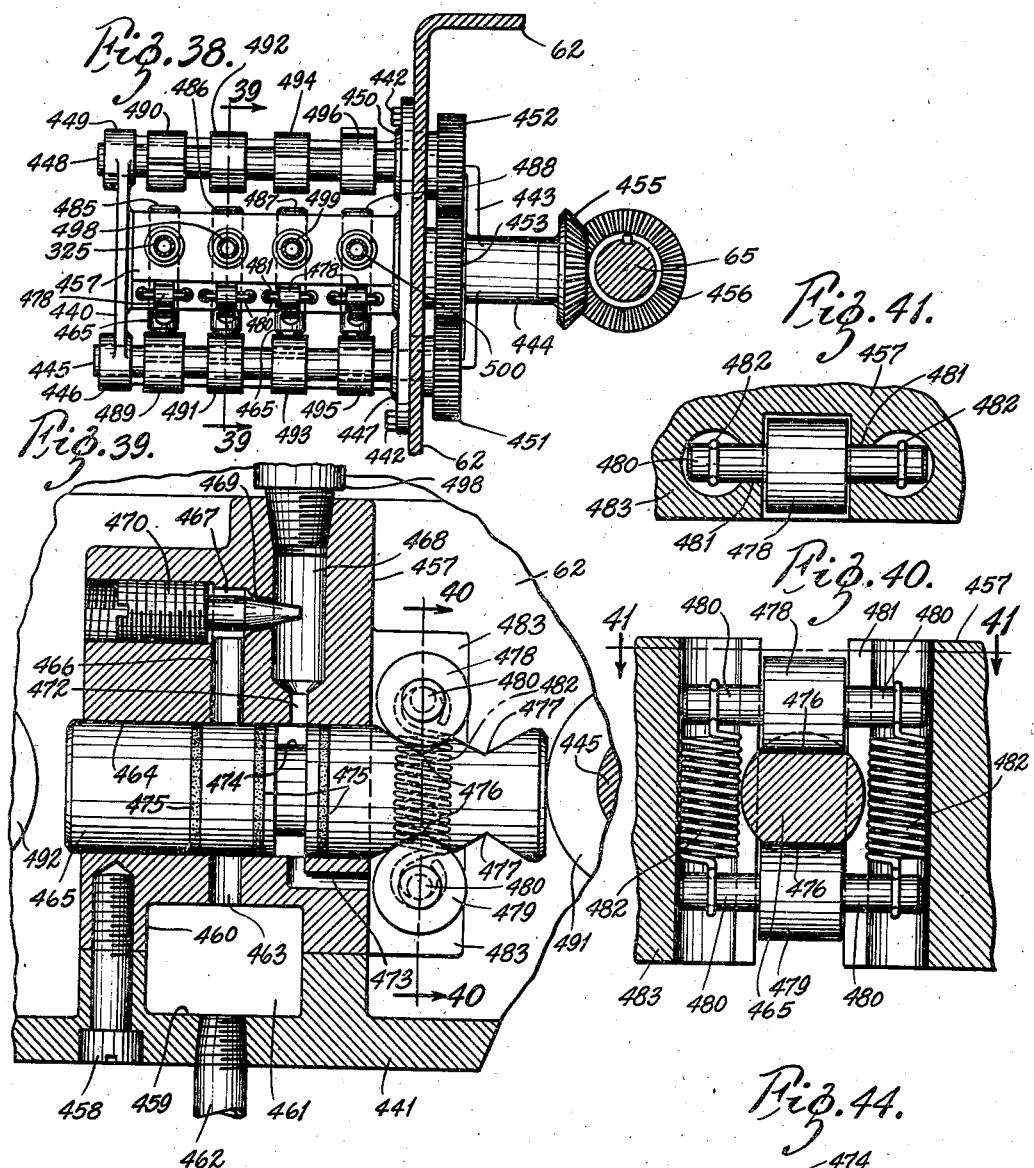
INVENTOR:
GEORGE ROESSLER,
BY Lawrence C. Kingsland
ATTORNEY.

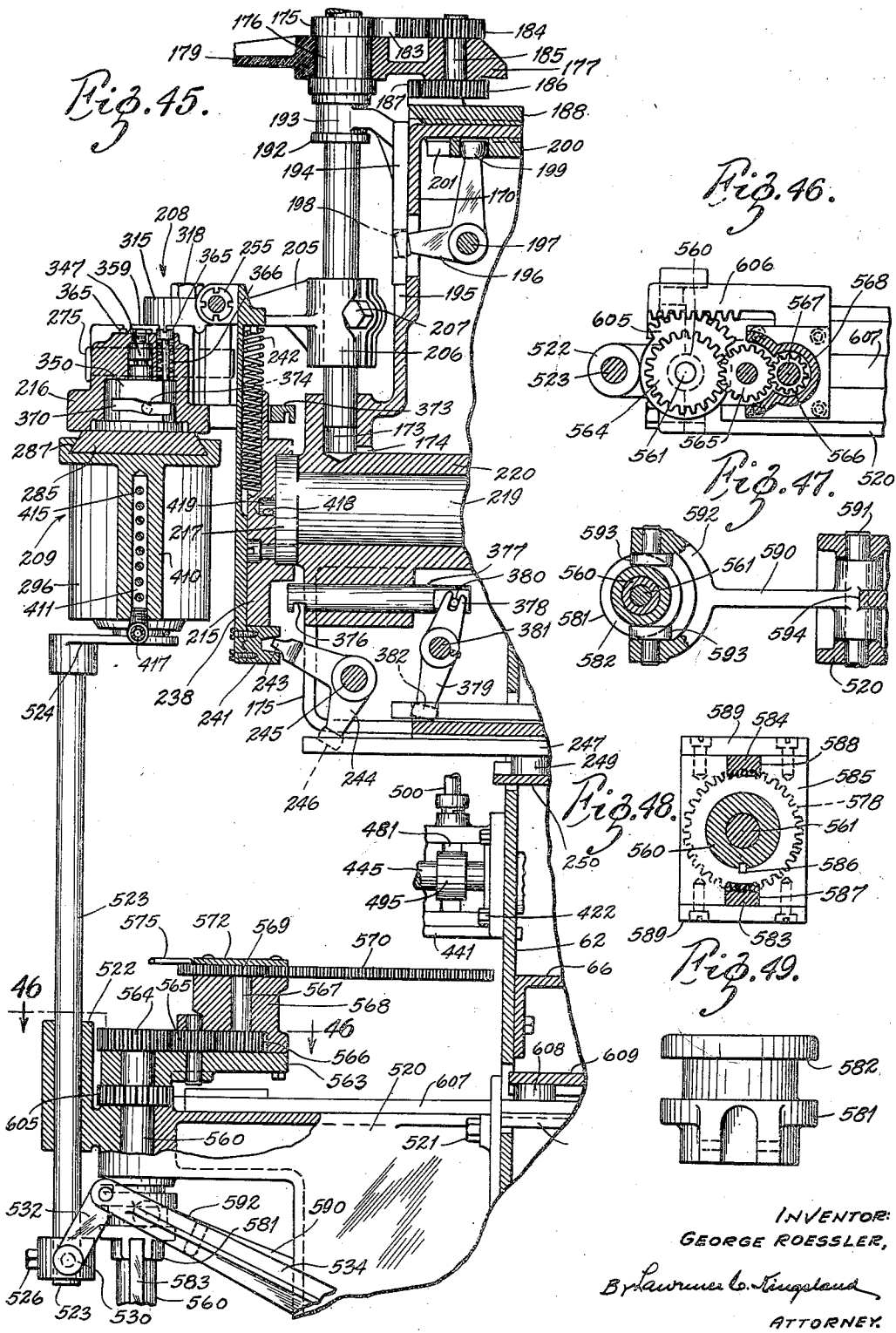

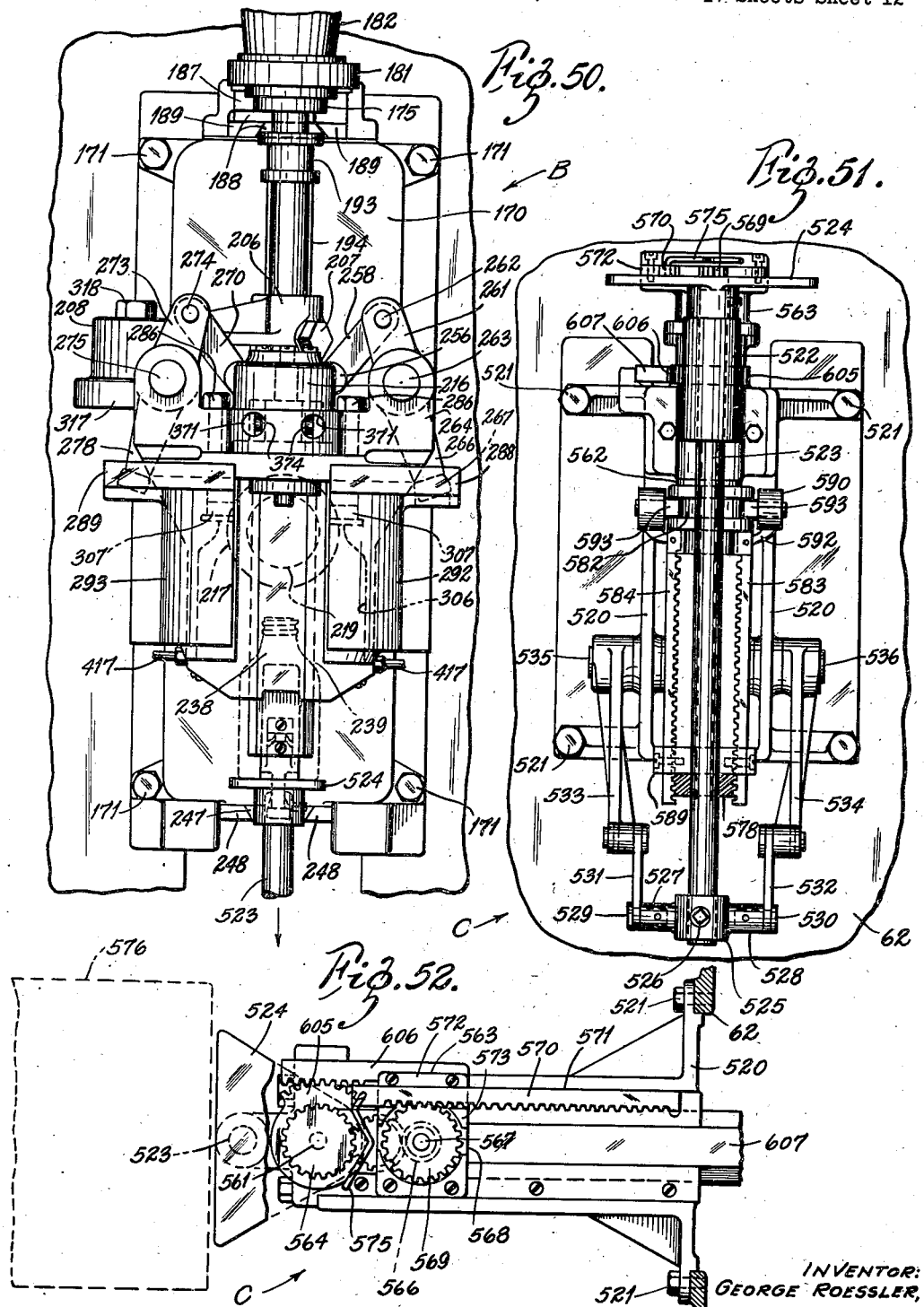

Jan. 13, 1942. G. ROESSLER 2,269,553
GLASS MACHINE AND METHOD OF MAKING GLASS
Filed Oct. 8, 1936 17 Sheets-Sheet 13
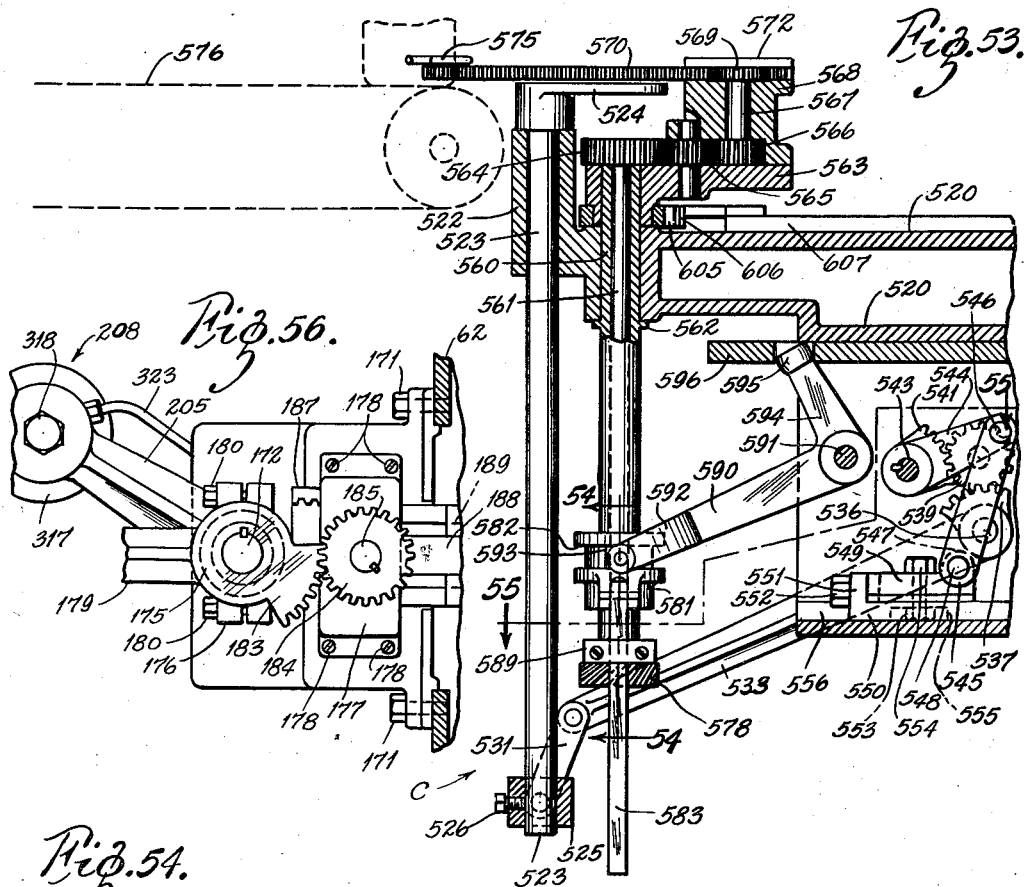
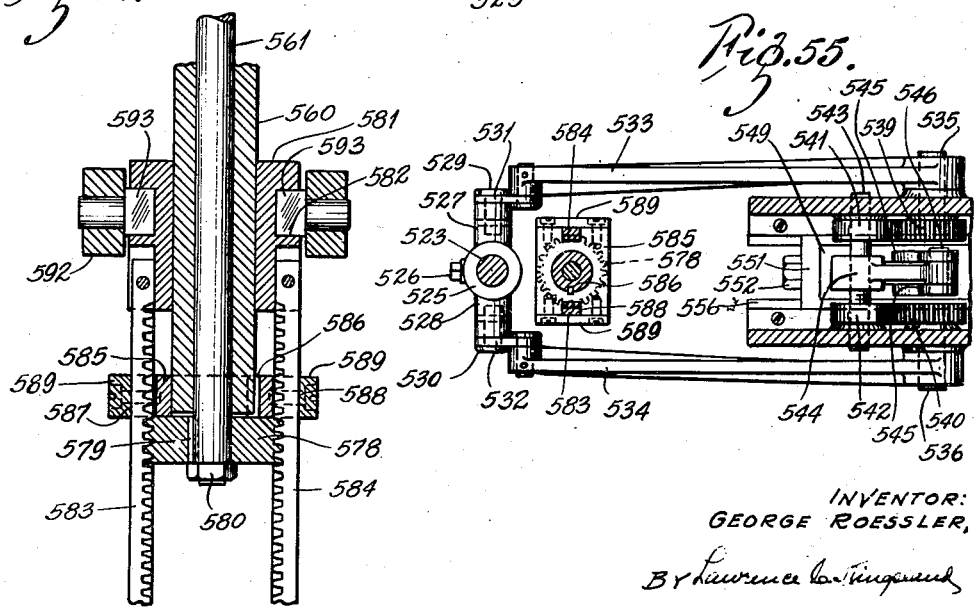
INVENTOR:
GEORGE ROESSLER,
ATTORNEY.

Jan. 13, 1942.   G. ROESSLER   2,269,553
GLASS MACHINE AND METHOD OF MAKING GLASS
Filed Oct. 8, 1936   17 Sheets-Sheet 14
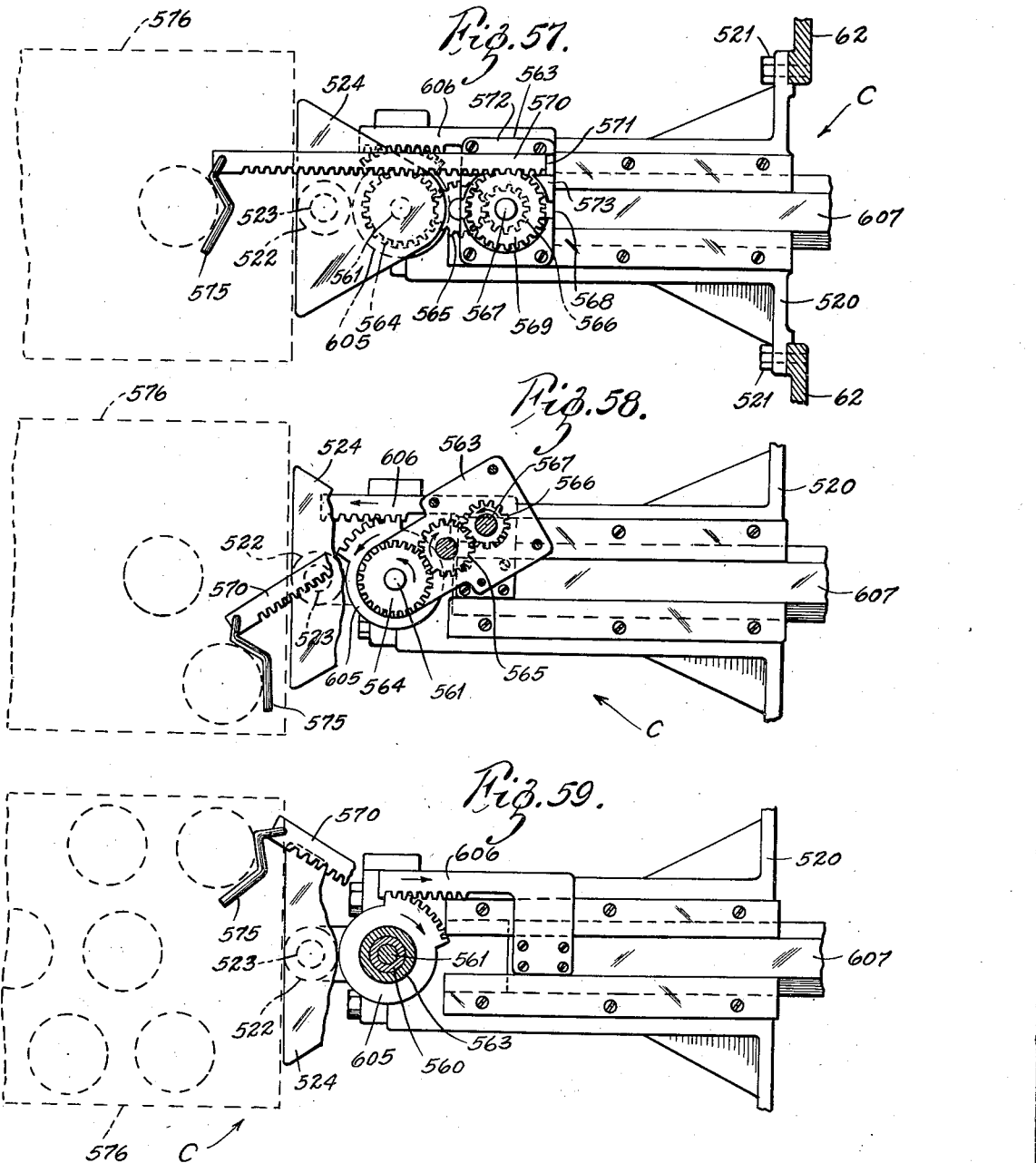
INVENTOR:
GEORGE ROESSLER,
By Lawrence C. Kingsland
ATTORNEY.

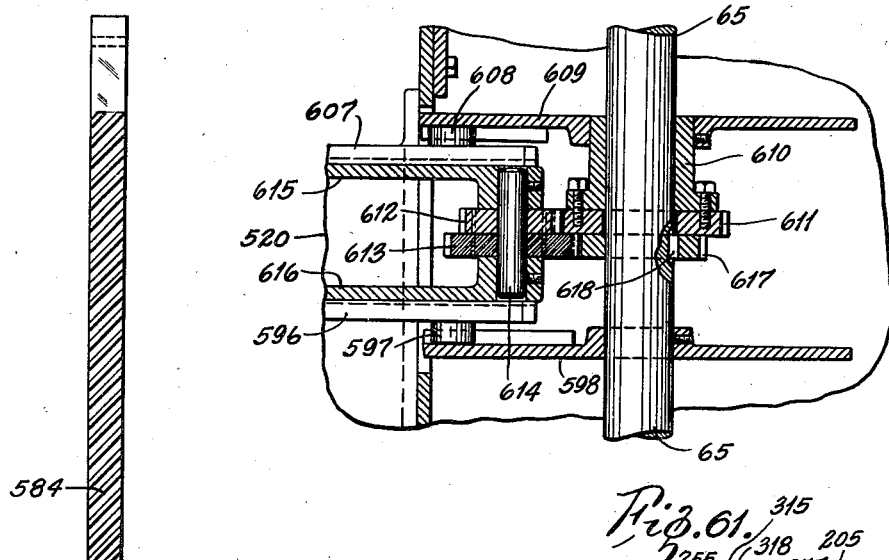
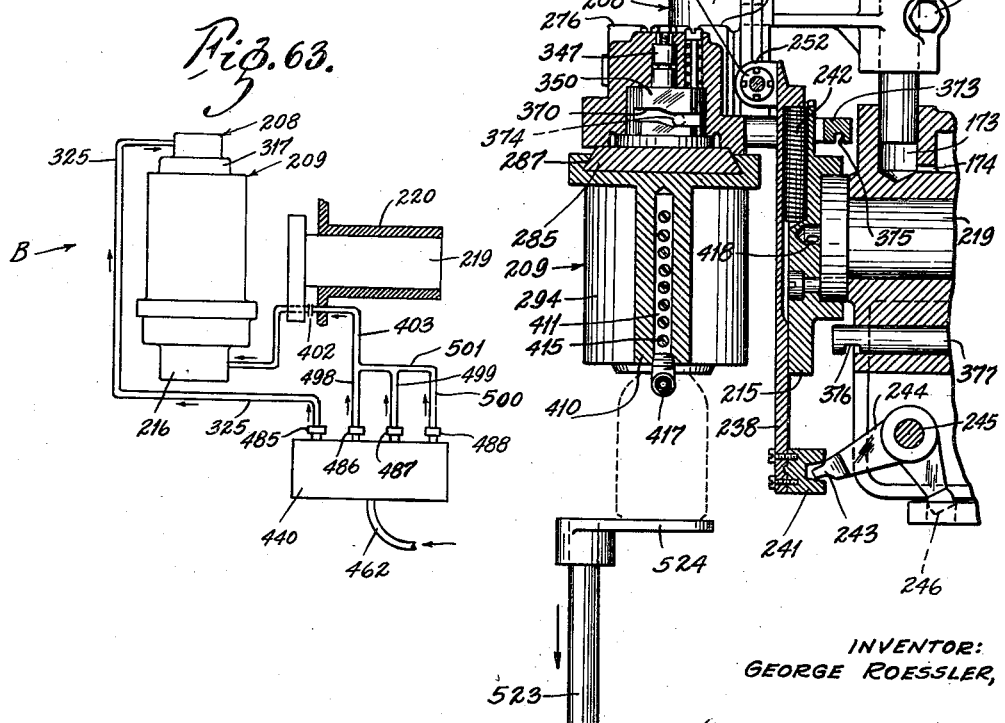

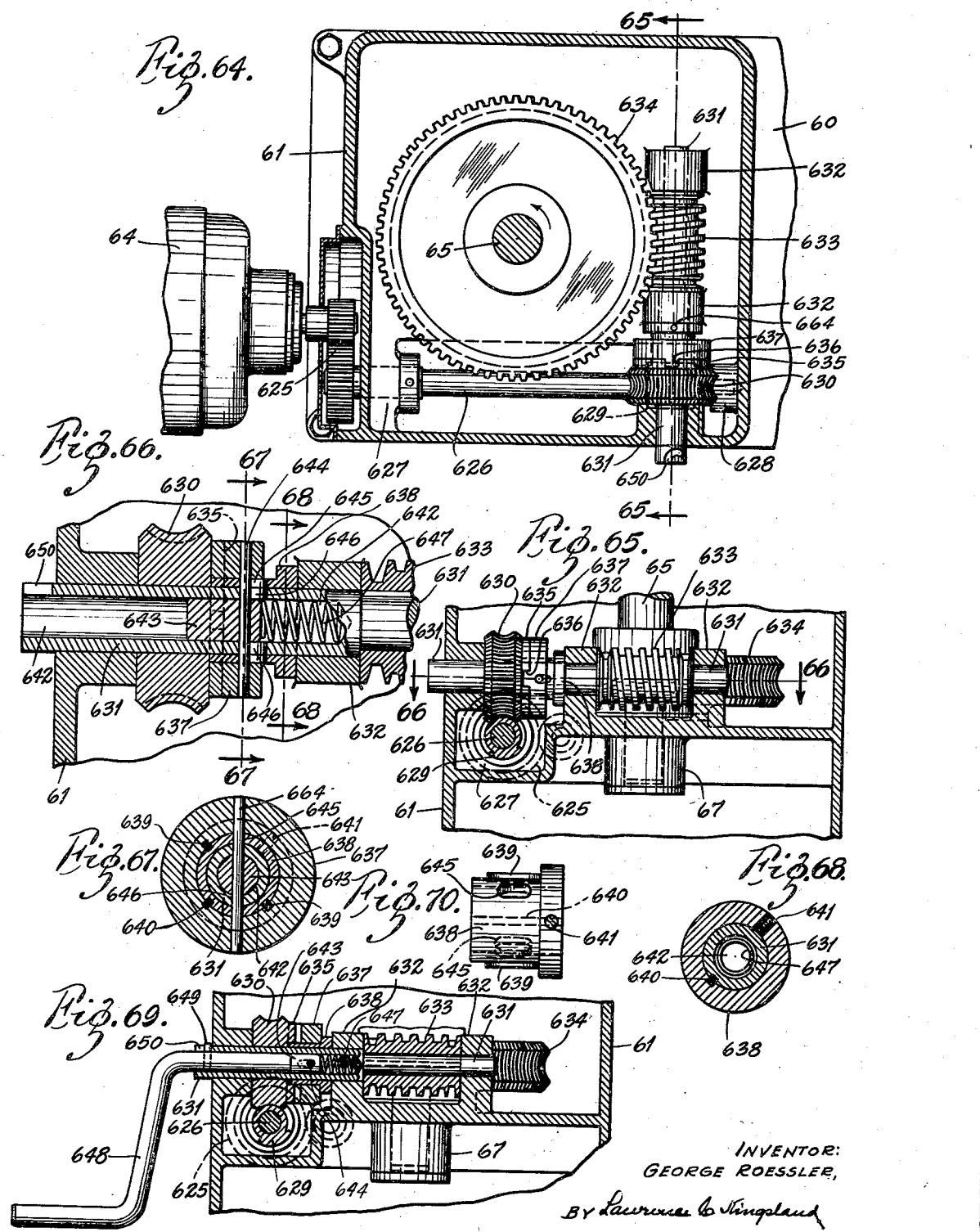

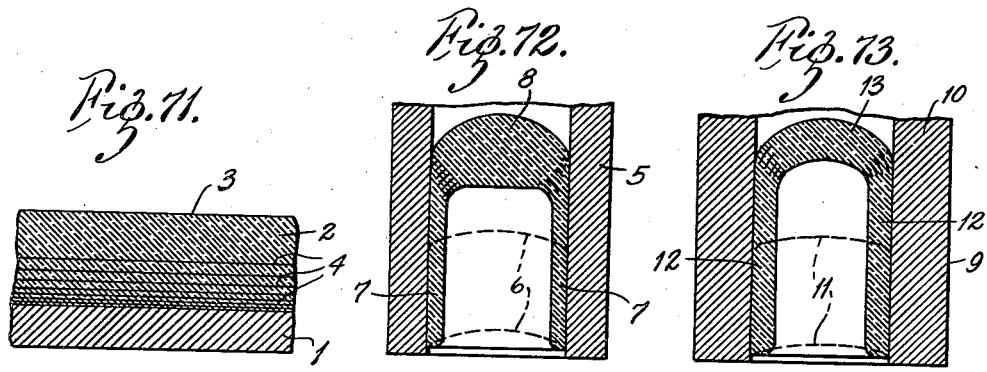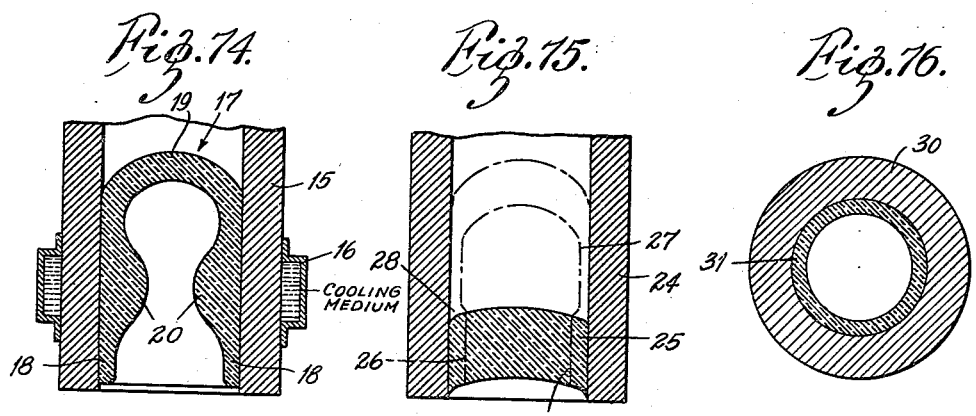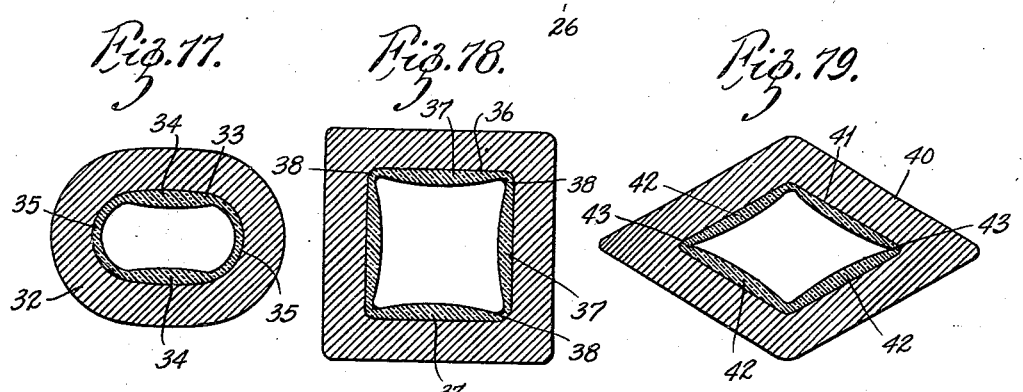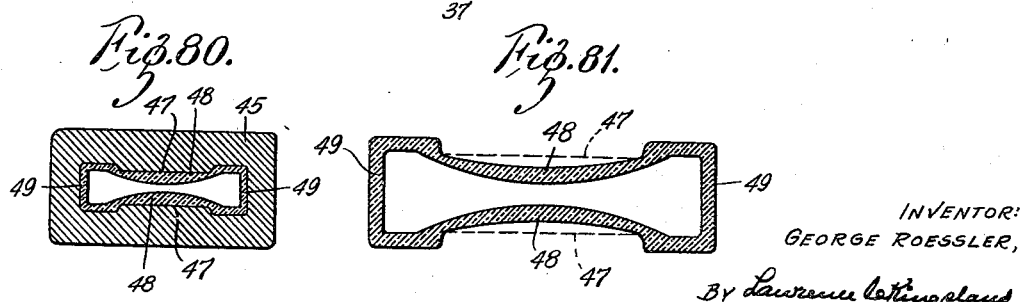

Patented Jan. 13, 1942

2,269,553

UNITED STATES PATENT OFFICE 2,269,553

GLASS MACHINE AND METHOD OF MAKING GLASS

George Roessler, East St. Louis, Ill.

Application October 8, 1936, Serial No. 104,649

45 Claims. (Cl. 49—5)

The present invention relates to a new method of making glassware and to a machine comprising new principles of operation, and which is adapted to employ the new method.

Prior to a more detailed discussion of the principles underlying the present invention, a brief résumé of glassware manufacture will be given.

This system involves, in general, four stages; the first, or melting stage, involving the furnace or tank; the second, or feeding stage, including the forehearth having its orifice together with means for discharging the hot glass from the orifice in the shape of a gob; and shears synchronized in operation with the discharge means for severing the gob from the mass of glass within the forehearth; the third stage comprising the forming means in which the glass is molded to the desired useful shape together with various other manipulative means; and the fourth stage wherein the formed ware is annealed to remove internal stresses resulting from its previous fabrication.

The first principles of the present novel method relate to the third stage, i. e., the forming stage. Therefore, this stage requires further analysis in the matter of its practice heretofore in order to set forth that which is novel herein.

From the time when glass was blown by the hand method, forming has involved two distinct steps; the first of these comprising the making of a preliminary shape, and the second, the blowing or expanding of this preliminary shape to the size and shape of the final ware. With the advent of mechanical means for forming glass, these two steps were translated into various mechanisms. Consequently, present forming means include, first, a blank or parison mold in which the "finish" is made and a certain preliminary formation is given the viscous glass, and, second, a separate blow or finishing mold in which the glass is brought to the shape and size of the final ware and retained until rigid.

Under present methods, the principles of operation assume that the glass, when blown, will expand generally equally in all directions, theoretically to form a hollow sphere. Therefore, if a mass of hot, viscous glass is suspended in a non-spherical mold, and inflated, its expansion will cause it to contact the mold at certain places prior to contacting others. As the mold is relatively cold, the glass first contacting and remaining in contact, will cool to a greater depth, causing an excess of glass at such places, and consequent deficiency at places later or last to contact. For illustration purposes, reference shall hereinafter be made to bottle ware, since it clearly illustrates the present principles.

Therefore, it may be seen that the blank or parison mold constitutes an essential intermediate step in ware making. It has two functions, one to form the "finish" and the other to provide a preliminary form to counteract the above maldistribution of glass in the blow or finishing mold.

Relative to the aforesaid first function of the blank mold assembly, the finish constitutes the upper end of the neck of the bottle approximately throughout that portion which receives the cap or seal. From this finish, made to final form in one operation, the remainder of the parison is shaped. In other words, the finish constitutes a completed index from which, as a start, all subsequent manipulations are performed to make the ware. The viscous gob of glass is ordinarily received into the inverted blank mold as a solid mass, which is drawn by vacuum or blown by compressed air downward and into the bottom of the mold including the recesses of the finish cavity. At the center and protruding into the finish cavity of the mold is a plunger or plug which, when withdrawn, makes a starting cavity for the bubble which inflates the blank. The plunger causes an enamel on the glass which contacts it, but this remelts when the plunger is retracted and the glass becomes viscous again. There is no particular necessity for the plunger to extend into the finish cavity, except rigidly to freeze the extreme lower edge of the finish in order that it may maintain its position without distortion when the mass of glass is blown back. The plunger accomplishes this purpose.

The second function of the blank or parison mold is to obtain a pre-formation of the gob to a shape intermediate that of the substantially shapeless gob, and that of the final ware. This shape is designed to compensate for the excesses and deficiencies inevitable in the system embodying the spherical expansion principle of molding. The parison is so shaped that, when suspended by its finish in the blow mold, and expanded, the shape will automatically compensate for the described overages and underages. The temperature of the mold is but one factor in this compensation, which also involves the shape and proportions of the ware, the temperatures of the glass and parison mold, the time of exposure, etc. There has been devised no fixed set of rules by which parisons may be formed. They have of necessity been made by cut-and-try experimentation, and each finish mold requires its own parison designed for it.

When the blank is completed it is transferred or shifted into a finishing mold. The upper or neck portion of the mold cavity is made to fit the lower part of the finish, completed in the manner hereinbefore stated; and the parison is suspended by this index to give a proper location to the rest of the elements of the parison relative to the finishing mold. Air is then blown into the thus suspended blank in one or more stages to expand this hollow form and fill the finishing mold. Thus the glass is shaped to the form of the finished ware. It is subsequently removed from the finish mold and deposited in the lehr where it is annealed to remove internal stresses.

The essence of this old method consists of forming a parison having a finish thereon, then transferring the parison and suspending it by the finish in the blow mold, and finally blowing it out by expanding it in all directions, downward from the finish, so that it fills the blow mold to make the completed ware.

The present invention involves first a method by which the formation of a separate parison can be avoided. This method employs a different principle of inflation of the glass, to be described, and principles whereby the heat dissipation in the hot glass can be controlled so as to obtain proper distribution of the glass in a single operation. More specifically, the method involves the control of the temperatures of the mold relative to that of the glass, the adjustment of the heat-absorption characteristics of the mold in its several parts, so that glass longer in contact may be prevented from excess cooling, control of the time of operation of the molding, in its several aspects, since heat dissipation is likewise a function of time, and finally a method of selectively varying the several factors to obtain their proper interrelation so as to produce in a single mold completed ware having proper distribution superior to that of former methods.

In its second aspect, the present invention involves a more comprehensive embodiment of the above forming method to the manufacture of glassware. In other words, the method embodies the formation of the glass from the melting stage to the annealing stage, complete in a series of mechanically intercontrolled steps, particularly possible by virtue of the inclusion of the above forming system completed in one stage of operation.

The invention likewise comprehends molds having means to obtain the desired results, and a glass making machine embodying a feeder, shears, the molds referred to, a ware take-out, and lehr discharge means, all mechanically intercontrolled, with the control, its adjustments, and the several mechanisms compactly arranged in a single structure.

It is a primary object of the present invention to provide a controllable and defined method of forming glass in the mold with a view to obtaining the desired distribution.

It is a further object of the invention to provide a method including receiving the glass material directly into the finishing mold to make ware.

It is a further object of the invention to provide a method whereby the glass is received in the finishing mold, is therein blown down to form the finish, and blown back to make the completed ware.

It is a further object to provide a method of forming glassware without forming the material therefor in an intermediate stage between the gob and final ware.

It is a further object to provide a method of forming glass without a suspended blank or the transfer of it.

It is a further object to provide a method of forming glass in a single finish mold eliminating the necessity of a separate parison mold.

It is a further object of the invention to provide a mold designed to effectuate this method.

More specifically, it is an object of the invention to provide a means for dissipating or carrying away the heat of the glass in order to set the glass, the means being regulatable such that the speed of the aforesaid setting and the distribution throughout the mold of the heat dissipation can be controlled.

It is a further object of the invention to provide a method and appropriate means therefor to obtain increased ductility of the glass at certain places according to predetermined principles; and to obtain reduced ductility in other parts in like manner.

It is a further object of the invention to provide a method and means to make viscous glass flow reluctantly or readily at will and to any extent.

It is a further object of the invention to provide a method involving the proper distribution of the heat of the mold so as to control the penetration of the hardening action of the mold on the glass as it is being formed.

It is a further object of the invention to co-ordinate the application of air pressure in regard to time, amount, and duration, with the distribution of the heat aforesaid, so as to obtain the finished ware in a single mold operation.

A further object of the invention is to control the penetration of the hardening of the glass when contacting with the mold in suchwise as to obtain walls in the finished ware of substantially even ir controlled relative thickness.

It is a further object of the invention to provide means to prevent the hardening of the glass in certain portions of the mold.

It is a further object to provide means for accelerating the hardening of the glass in certain portions of the mold.

It is a further object of the invention to provide such control of the cooling of the glass as to permit the formation of ware without exaggerated initial stresses and superior to what formerly has been obtained.

It is a further object of the invention to provide a machine for carrying out each and all of the principles and features of the method and theory.

It is a further object of the invention to provide a machine for forming hollow glassware in a single forming stage, eliminating the parison.

It is specifically an object to provide a compact machine, executing all of these operations, and all mechanically connected for consecutive, coordinated actuation.

It is a further object to provide a single machine having a feeder, forming means to form the glass, and means to discharge the same, and all mechanically operated in timed relation.

It is a further object of the invention to provide in such a mechanically timed machine suitable means for adjustment of the several functions, one relative to another.

It is a further object to provide a machine having feeder control means, shear means, forming means and discharge means, and a single shaft with mechanical connections between said shaft and said several means to operate them in timed relationship.

It is a further object of the invention to provide a machine having a single vertical shaft with the following mechanisms disposed thereon, one beneath the other in the order named, to-wit: feeder means, shear means, forming means and discharge means; together with adjusting means on said shaft for controlling said mechanisms in timed relation.

It is a further object to provide a compact and conveniently adjustable shear mechanism which is particularly applicable in the above combination.

It is a further object to provide a suitable shear actuated by mechanical means.

It is a further object to provide a mold having adjustable means to control the temperatures thereof so that they may be varied over the extent of the mold.

It is a further object to provide a mold having a series of grooved chambers for use with air, water, steam, or other cooling medium.

It is a further object to provide means to seal the mold, means to turn the said mold, and means to open and close said mold, all operated from said main shaft in timed relation.

It is a further object to provide a mold operable in the above connection, and in which the mold sections may separate completely from one another.

It is a further object to provide a valve in the bottom plate portion of the mold such that air can be blown into the mold, but which closes when the glass presses against it.

It is a further object to provide a means for introducing the air of the blow back at the extreme upper end of the finish plunger.

It is a further object to provide a poppet type valve in the plunger to get the quickest possible action from the air.

It is a further object to provide means to flow or inflate the glass in said mold, together with means for operating and controlling the same from said shaft.

It is a further object to provide a method whereby the ware is discharged from the mold and set upright without intermediate handling.

It is a further object to provide a method avoiding grasping the ware by any clamps or the like during its fabrication.

It is a further object to provide receiving means adjustably movable to position to receive the ware from said mold and transport the same to a position to be discharged to the lehr, and operated in timed relation from said shaft.

It is a further object to provide such receiving means operable from an initial position to a position wherein to receive the ware, together with means for varying the second named position without substantially altering the first named.

It is a further object to provide a means for thrusting the ware from said receiving means to the lehr, after said ware is transported from the mold, and said means being operated in timed relation from the shaft.

It is a further object to provide such a discharge means automatically movable to several positions wherefrom to discharge the ware in a plurality of positions onto the lehr.

It is a further object to provide, in said means automatically movable to several positions, a movable element to effect the discharge, and means for moving said element to obtain the same distance of travel of the element in each of the said positions.

It is a further object to provide a discharge means having a vertical, horizontal and radial motion with the vertical and horizontal motions connected in such a way that any movement of the radial motion will not change the relative strokes of the vertical and horizontal motions.

In the drawings:

Fig. 1 is an elevation, partly in section, of the entire mechanism.

Fig. 2 is a sectional view of the upper part of the mechanism including feeder, shears, and forming mechanism.

Fig. 3 is a sectional view of the lower part of the mechanism, including valve box, ware receiving and discharging means, and the power mechanism.

Fig. 4 is a plan view of the shear mechanism and feeder plunger, taken on line 4—4 of Fig. 1.

Fig. 5 is a front view of the shear mechanism taken at 5—5 of Fig. 1.

Fig. 6 is a section on the line 6—6 of Fig. 2.

Fig. 7 is a section on the line 7—7 of Fig. 2.

Fig. 8 is a view of the shear actuating crank.

Fig. 9 is a plan view of the shears with the blades closed.

Fig. 10 is a plan view of a representative cam.

Fig. 11 is a section on the line 11—11 of Fig. 10.

Fig. 12 is a view of one of the cam elements.

Fig. 13 is a plan of a cam collar.

Fig. 14 is an elevation of the cam collar.

Fig. 19 is a section on the line 19—19 of Fig. 2, showing the mold, and mold actuating means.

Fig. 20 is a section showing the left hand mold section of Fig. 15.

Fig. 21 is a section on the line 21—21 of Fig. 20, showing the blow down air ports.

Fig. 22 is a horizontal section of the mold taken on the line 22—22 of Fig. 20.

Fig. 23 is a section on the line 23—23 of Fig. 20, showing the finish mold element.

Fig. 24 is a plan of the blow down head and oscillating means taken on the line 24—24 of Fig. 2.

Fig. 25 is a section on the line 25—25 of Fig. 2, showing the turnover operating mechanism.

Fig. 26 is a section on an enlarged scale showing the water connections through the blow down shaft.

Fig. 27 is a section on the line 27—27 of Fig. 26.

Fig. 28 is a section on the line 28—28 of Fig. 26.

Fig. 29 is a horizontal section of the blow down head shaft and connections taken on the line 29—29 of Fig. 2.

Fig. 30 is a diagrammatical view showing the water connections.

Fig. 31 is a front elevation of the turnover plate.

Fig. 32 is a horizontal section on the line 32—32 of Fig. 31, showing an air connection.

Fig. 33 is a vertical section on the line 33—33 of Fig. 2.

Fig. 34 is a section on the line 34—34 of Fig. 33.

Fig. 35 is an enlarged view of the lower part of the forming means of Fig. 2.

Fig. 36 is a plan of the blow back valve actuating cup member.

Fig. 37 is an elevation, partly in section, of said member.

Fig. 38 is a plan of the valve box, taken on the line 38—38 of Fig. 3.

Fig. 39 is a section through the valve box taken on the line 39—39 of Fig. 38.

Fig. 40 is a section of the snap-action mechanism, taken on the line 40—40 of Fig. 39.

Fig. 41 is a section on the line 41—41 of Fig. 40.

Fig. 42 is a front elevation of a representative air valve cam.

Fig. 43 is a side elevation of the cam of Fig. 42.

Fig. 44 is an elevation of an air valve piston.

Fig. 45 is a side elevation, partly in section, showing the mold inverted and the ware receiving table elevated.

Fig. 46 is a section of the ware discharge gearing, taken on the line 46—46 of Fig. 45.

Fig. 47 is a section of the ware discharge actuating means taken on the line 47—47 of Fig. 3.

Fig. 48 is a section of the torsion block taken on the line 48—48 of Fig. 3.

Fig. 49 is an elevation of the ware discharge sleeve.

Fig. 50 is a front view of the forming means, showing the mold inverted and open with the ware on the receiving table.

Fig. 51 is a front elevation of the ware receiving means and ware discharging means taken on the line 51—51 of Fig. 1.

Fig. 52 is an elevation, partly cut away, of the ware discharge means taken on the line 52—52 of Fig. 3.

Fig. 53 is a view, partly in section, of the ware receiving and ware discharging means with the latter in discharging position.

Fig. 54 is a section on the line 54—54 of Fig. 53.

Fig. 55 is a section on the line 55—55 of Fig. 53, showing the ware receiving mechanism operating means.

Fig. 56 is a view similar to Fig. 24, but showing the blow down head removed to one side.

Fig. 57 is a plan view showing the ware discharge means advanced in one position.

Fig. 58 is a similar view, partly cut away, showing the discharging means in the second position.

Fig. 59 is a similar view, further cut away, showing the discharge means in a third position.

Fig. 60 is a view showing one of the discharge actuating racks.

Fig. 61 is a view, partly in section, of the mold inverted with the ware receiving means conveying the ware away from the mold.

Fig. 62 is a vertical section of the ware discharge means and actuating cams.

Fig. 63 is a diagrammatical view of the air lines.

Fig. 64 is a horizontal section of the power take off on the line 64—64 of Fig. 3.

Fig. 65 is a section on the line 65—65 of Fig. 64.

Fig. 66 is a section on the line 66—66 of Fig. 65.

Fig. 67 is a section on the line 67—67 of Fig. 66.

Fig. 68 is a section on the line 68—68 of Fig. 66.

Fig. 69 is a view similar to Fig. 65, but with the crank engaged and the clutch disengaged.

Fig. 70 is an elevation of the clutch sleeve.

Figure 15:
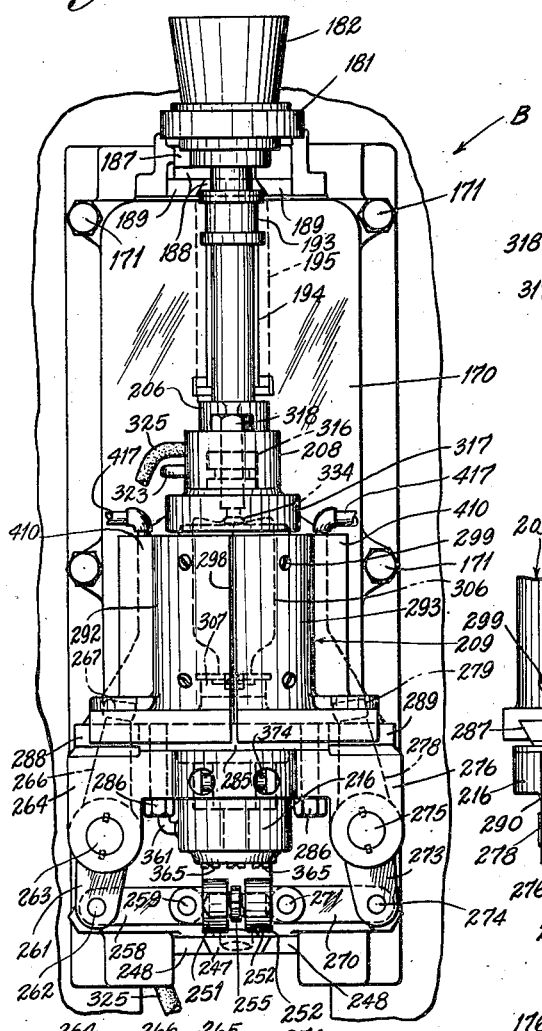
Fig. 15 is a front view of the funnel and forming means taken on the line 15—15 of Fig. 1.

Figs. 71–81 inclusive are vertical and horizontal sections of various forms of glass showing certain mold effects.

In detailing the new and improved process for the fabricating or forming of molten glass, the chief and ultimate consideration is the ductility of the glass material. The ability of glass to acquire a shape, and to be formed into useful articles, is related to and dependent upon the ductility of the glassy material. Oppositely, the ability of the glass to retain its shape after it has been formed is related to and dependent upon the lack or removal of this ductility. Therefore, the specific function of the mold is, first, to supply a cavity which is precisely correct for size, shape and figurements and, second, to remove the ductility from the hot glass.

It is a well-known fact that ductility is a function which is related to the temperature of the glass and which, as hereinbefore mentioned, is relative to other considerations. Ductility is known in the practical art as "the nature of the glass." There are a great many formulae for glass and each has its peculiar nature.

Therefore, to acquire a controllability of ductility, a high degree of controllability of temperature is required, and this range of controllability must embrace all the varying formulae of glass. The temperature of the glass which has been deposited in the mold is governed by the initial temperature of the glass and the temperatures of the various portions of the mold. These temperatures of the mold are, in turn, regulated by conduction, convection, specific heat, etc. The present method embodies the use of these phenomena according to the known laws of their operation. The mold devised has means for their control.

In Fig. 71, there is shown at 1, a slab of heat-absorbing metal, such as iron, upon which rests a mass of molten glass 2, the surface of which is at 3. The lines 4, indicate the hardening action of the heat-absorbing slab 1, in reducing the temperature and the corresponding ductility of the glass 2. The lines 4, adjacent the slab 1, are much closer together than those more remote therefrom, thus indicating the progressive manner in which the ductility of the glass is reduced adjacent the heat-absorbing surface.

When molten glass is subjected to cooling conditions, at least a very thin layer of the surface thereof freezes into a so-called enamel that actually consists of a skin of less ductile glass. The change is not chemical but is one of physical properties only. If the cooling conditions are sufficiently effective this enamel becomes absolutely brittle, although normally it is, to a varying degree, merely less ductile than the interior of the melted glass. According to the first law of thermo-dynamics, heat is constantly passing from the hot body to the cooler one. Necessarily, this action involves the transfer of heat from within the hot mass toward its surface and thence into the cooler body. The thermal gradient of glass is obtuse, or in other words, the rate of conductivity of glass is relatively low and this is true even at elevated temperatures. But the specific heat of the iron, or its ability to absorb heat, is relatively high. Therefore, the iron sets up a drastic condition of heat absorption at the surface and this absorption is much faster than the reluctant conductivity of the glass is able to replenish; so that as a result, a reduction of temperature and decrease of ductility penetrate inwardly, with decreasing degree, from the surface of the glass. In suchwise, therefore, a skin and wall of less ductile glass is formed, the depth of which is herein termed the penetration factor. The penetration factor varies according to the relative temperatures of the glass and the iron and also according to the duration of the contact between them.

In Figs. 72 and 73 are shown the effects of blowing a mass of glass into a three-dimensional form according to the principles outlined hereinbefore. In Fig. 72 is shown a cylinder having a wall 5. A mass of glass 6, shown in dotted lines, has been located within the cylinder and has been blown to position shown in full lines. In the original mass 6, owing to contact with the wall 5, there has been a marked reduction of ductility for a certain distance inwardly therefrom. This is in accordance with the principle of penetration heretofore stated. The central portion of the mass has remained hot and therefore ductile and much less resistant; and, consequently, upon application of compressed air to the bottom of the glass in the cylinder the less ductile portions adjacent the wall remain fixed, forming the wall 7, whereas the hot central portion is pressed upwardly and rolls outwardly to form an extension to said wall and the top portion 8.

Since the penetration is a function of heat dissipation from the glass into the cylinder wall 5, the thickness of the glass at 7 will vary in accordance with the capacity for heat absorption of that wall. Referring now to Fig. 73, there is shown a cylinder having a wall 10, which is considerably thicker than the wall 5 in the previous figure. A mass of glass 11 has been disposed within the cylinder and then blown precisely as before to provide walls 12 and a top 13. Since the wall 10 has a greater thickness than the wall 5, it can absorb more heat from the glass than can 5. Consequently, the penetration adjacent the wall 10 is greater and therefore the glass is thicker than that which is adjacent the wall 5. Hence, other factors being equal, when the glass is blown, the wall 12 will be thicker than the wall 7, and the top portion thinner since more glass has been required to form the wall. Stated differently, since the penetration in Fig. 73 is greater, the mass of the less ductile glass is greater and the mass of the more ductile glass which is responsive to the pressure of air is smaller. The cylinder in Fig. 73, because of this action in connection with the thick walls is said to run cold.

The above illustrations disclose the effect of one of the factors, i. e., the thickness or weight of the wall. It is assumed in these, that all remaining factors except this weight are identical. Now suppose that a new factor, the time factor, is introduced. If the air pressure in the cylinder, Fig. 72, is not applied until the expiration of a greater period of time than that used before, the heat transfer from the glass into the cylinder will have had longer to be effective and the penetration will be greater. With this delay in applying air pressure the resulting glass wall will be thicker and approach that of Fig. 73.

Additionally, if the initial temperature of the cylinder of Fig. 72 is made substantially less than that of Fig. 73, so that the heat differential between the glass and the cylinder is greater, the penetration will again be increased and likewise the resulting glass wall of Fig. 72 may approach that of Fig. 73.

Also the initial temperatures of the glass will affect the penetration in a similar manner.

Now, therefore, an object of the invention is to use these factors and to control them to the end of obtaining the desired distribution of the glass. It is to be kept in mind that bottles and other ware are of a great variety of shapes, sizes, weights and figurements so that the effects above described must be applied in a variety of combinations to accommodate the method to such conditions. The present invention discloses how they can be controlled and that, by so doing, the remaining objects set forth can be attained.

In Fig. 74 is shown a cylinder at 15 having a passage therearound and through which a cooling medium may flow to affect a limited portion of the wall of the cylinder. The glass 17 is blown within the cylinder. It has cylindrical walls 18 and a top 19. Opposite the passage 16 are found the bulges 20, these being caused by the greater penetration afforded by the cooling medium within the passage 16. Or, in other words, at the points in the cylinder wall affected by the cooling medium, the heat transfer is greater than that in the remaining portions of the cylinder, owing to greater capacity for heat absorption at such points.

Here further consideration of the time factor is in order. In Fig. 75 there is shown a mass of glass at 25 before it has been blown. This glass will have remained in contact with the cylinder wall a certain length of time before it is blown so that some penetration has taken place, such as may be indicated by the dotted lines 26. Now, if compressed air is applied to the bottom of this gob of glass, the portion within the lines 26 will be displaced upwardly leaving the portion outside the lines as the lower wall. If this compressed air is applied very rapidly and under high pressure, the displaced glass coming into contact with the upper portions of the wall of the cylinder will have little time to transfer its heat to these walls as it progresses so that the penetration will be relatively small. Hence, after the blowing, the result may be such as is shown in the dot-and-dash line 27. Under extreme conditions, the glass could be blown almost away from its original mass adjacent the point 28, and also there could exist a high water mark at this point. If glass is blown slowly, then, as it progressively comes in contact with the upper part of the cylinder, it is given a sufficient time to obtain equal penetration with that of the original mass and its resulting shape will be such as is shown in Figs. 72 and 73. Or, conversely, if the initial position of the glass is not maintained for any appreciable length of time and the blowing is started before excessive penetration has taken place, then the same final accomplishment will obtain. And, finally, a combination of the quick blow with a cylinder wall which is running hot in the lower portion gives the extreme of this factor. These various factors are synthesized into the present method.

In old methods, cross-sectional distribution of the glass is impossible of attainment above a certain low standard. This is inherent in the suspended blank method, as has been indicated heretofore, where the expansion of the parison must take place in all directions.

Figs. 76–80 illustrate cross-sectional distribution in typical examples as they appear according to present practice. Fig. 76 shows a plain round mold 30 in which the glass 31 touches the surface of the section at all places practically at one and the same time. The wall thickness is approximately even all the way around. Fig. 77 is an elliptically shaped mold 32 in which the glass 33 touches, at the time of the inflation of the blank, at 34, somewhat before it touches at 35. Therefore, the thickened portions or saddles are caused by longer contact of the glass at 34 than at 35. The thicker the glass is at 34, the less glass is left to stretch into 35. Fig. 78 is a square shaped mold wherein the glass 36 forms saddles 37 by earlier contact, leaving the corners 38 deficient. Fig. 79 is a diamond shaped mold 40 in which the same effects occur in an extreme way. The glass 41 has saddles 42 and acute corners 43. It is extremely difficult to obtain corners not blown out to a thin fragility. Fig. 80 is a slender panelled mold 45, the panels being shown at 47 with saddles 48. As a result of the saddles 48, the edges 49 are blown very thin. The edges 49 are frozen quickly, being thin, and contract before the thicker and saddled sides. In this example another phenomenon is also illustrated. The panels 47 sink because the quickly setting edges chill and contract in advance of the sides. Each edge of the bottle becomes a frame or hoop which contracts and causes the sides to be twisted in, as shown in Fig. 81. The sides subsequently cool and contract so that, with the edges rigid, the sides pull at the edges with exactly the reverse action of the twist originally produced by the edges. The sides are thick and strong and the edges are thin and weak and so extreme conditions of internal stress are set up.

In the method of the invention, these results are avoided, the cross-sections showing even distribution save for slight rounding of the internal surface opposite corners, such rounding adding strength where most needed.

As will appear from the detailed discussion to follow, the new method and mechanism overcome these above faults in present practice, providing even distribution of glass. In doing so, they control the penetration and reduce, to a great extent, the undesirable internal stresses and deformations occurring in the finished ware. They do all of this, following known principles, so that it is entirely controllable, thus eliminating the cut-and-try methods now practiced.

Referring to Fig. 1, the mechanism includes a base 60 upon which is mounted a bottom housing 61, an upper housing 62, and a back plate 63. The latter is attached by any suitable means, as screws (not shown), whereby it may be removed. On the bottom housing is a power means 64 driving through suitable mechanism a vertical shaft 65 that extends up through the housing 62, and is supported in bearings 66 formed on the housing, and a bottom bearing 67. From this shaft 65, all of the various mechanisms are controlled and operated. For convenience, these mechanisms may be divided as follows: at the top there are feeder and shear mechanisms A. Beneath the mechanisms A are funnel and mold mechanisms B. Beneath the mechanisms B are receiving and discharge mechanisms C.

Referring first to mechanisms A. On the housing 62 is located a cylinder 70 in which reciprocates a piston 71 having a connecting rod 72 for operation thereof. An air tube 73 is connected to the conventional air bell of the feeder mechanism 74, whereby negative and positive pressures produced by the piston 71 eject or withdraw glass from the orifice 75 of the feeder mechanism.

Supported laterally on the housing 62 is a frame 76 having a pair of upstanding ears 77 thereon. A shaft 78 is mounted between the ears 77. A driving arm 79 is oscillatably mounted on the shaft 78. It has at one end a ball and socket connection 80 with the connecting rod 72 whereby to reciprocate the latter to drive the piston 71. At its opposite end, it has a hollow rectangular shape providing a rest 81 for a purpose to be described, and a table 82 through which is mounted an adjusting screw 83 for purposes to be described. Mounted within the hollow of the arm 79 is a crank 84 likewise oscillatable on the shaft 78. The crank 84 has three projections thereon. One of these, 85, has an adjusting screw 86 therein adapted to strike the rest 81 of the arm 79. Another of these extensions 87 is adapted to strike the adjusting screw 83 on the table 82. The third arm 88 at its outer end forms a ball and socket connection with a slide 89. This slide reciprocates in runners 90 in the frame 76 (Fig. 7). At its end opposite the ball and socket connection, the slide 89 has a cam roller 91 operated by the cam 92 keyed to the main shaft 65 and held thereon by a set screw 93. Thus, as the shaft 65 is rotated, the cam 92 will correspondingly rotate to reciprocate the slide 89 and operate the piston 71 through the medium of the arm 79 and the rod 72, as will be set forth in greater detail hereafter.

The frame 76 is provided with a slide surface 94 upon which rests a shear column 95, the column being hollow as shown. Runners 96, having removable top plates as shown, cooperate with complementary runners on the lower edges of the column 95 to hold the latter in place. Through an upstanding ear on the frame 76 extends an adjusting screw 97 threadedly engageable with the column 95 to reciprocate the column toward and from the shaft 65 on the table 94. A lower extension 98 on the column 95 fits within the frame 76 and has a bearing 99 at the bottom thereof. At the top of the column 95 are two ears 100. Adjusting screws 101 and 102 operate in these ears 100 (see Fig. 5).

Fitting closely down into the inside of the upper portion of the column 95 is a threaded tubular part 103 of a shear bracket 104. An adjusting nut 105 surrounds this tubular part 103 and rests on top of column 95 so that by rotation of this nut the bracket 104 may be raised or lowered. Opposed ears 106 on the column 95 may be drawn together tightly by a screw 107 to maintain the tube 103 at its adjusted elevation. The upper part of the tube 103 is provided with a bearing 108. Journaled in the bearing 99 on the frame 76 is a rotatable shaft 109; and journaled in the bearing 108 on the bracket 104 is a shaft 110 tubular in its lower part. The shaft 109 extends upwardly into the shaft 110 and is keyed thereto at 111 whereby the shafts are relatively axially movable but rotate together. A lug 112 on the bracket 104 extending downwardly between the screws 101 and 102 provides for fine adjustment of the tube 103 about its axis; and when the screws are tightened, they will maintain the tube against slipping.

The shear bracket 104 is provided with an upstanding extension 120. This extension includes two lateral projections 121 and 122 (see Figs. 4 and 9). Since these two projections are equal and opposite, only one need be described in detail. Each bracket is provided with an undercut runner 123 at the top surface thereof toward the main shaft 65, this runner spanning two opposite end walls 124 and 125 (Fig. 5) and providing an opening beneath the runner and the bottom wall 126 for a purpose to be described. Opposite the runner 123 is a detachable runner 127 held to the projection by screws 128. The two runners are undercut as shown in Fig. 2 to receive shear blades 129 and 130 on the respective projections. It will be understood that the shear blade 130 on the projection 122 is at a slightly different elevation than the blade 129 on projection 121, so that the shear edges may come together and overlap, as shown in Fig. 9.

On the vertical part of each extension is a bearing cap 135 held in place by screws 136 to form a journal. In each of these journals is supported a shaft 137 of a crank 138 shown in detail in Fig. 8. The upper crank arm 139 has at its outer end a stud 140 and a lug 141. Its other arm 142 has a stud shaft 143 having a cotter pin hole 144 therethrough. In position, the arms 139 extend beneath the runners 123 and the shear blades through the opening previously described. The lugs 141 fit into slots 145 in the shear blade. Consequently, when the cranks 139 are oscillated, they will move the shear blades in or out. As will be shown the two arms are oscillated oppositely so that the shear blades are brought together or separated.

Rotatably mounted on the upper end of the shaft 110 in the tube 104 is a disc 150. On diametrically opposite points of the disc 150 are secured studs 151 and 152. Overlapping and oscillatably secured to the stud 151 and 152 are angular connecting arms 153 and 154. Cotter pins are provided to hold the connecting arms to the studs. At their outer ends, the connecting rods are secured over the studs 143 of the respective cranks 138 and held thereon by cotter pins extending through holes 144. Thus as the shaft 110 rotates 180° clockwise, in Fig. 4, it will shift the connecting arms and their cranks to close the shears as shown in Fig. 9. The reverse operation of the shaft 110 obviously opens the blades.

At the bottom end of the shaft 109 is secured a gear 160. This gear meshes with a rack 161 on a slide 162 supported in the frame 76, tracks 163 being provided therefor as shown in Fig. 6. The slide extends into the housing 62 and has adjacent its inner end a cam roller 164 that is engaged by a cam 165, which cam is keyed to the main shaft 65 and held by a set screw 166. Consequently, as the cam rotates the rack 161 is reciprocated to oscillate the gear 160 and operate the shears. The operation is synchronized through the main shaft with the feeder operation.

Referring to section B of the mechanism, there is a frame 170 projecting outwardly beneath the frame 76 from the main housing 62 and held thereto by suitable bolts 171 (Figs. 15 and 50). This frame 170 has a shaft 172 journaled therein at 173 and vertically slidable in the journal, a port 174, preventing back air pressure in the journal. This shaft is likewise journaled in a flanged sleeve 175, which sleeve in turn is rotatably mounted in a bearing 176 formed on a bracket 177 attached to the frame 170 by screws 178 (Fig. 24). The bracket 177 terminates at its outer end in half of the bearing 176. An extension 179 has formed thereon the cap of the aforesaid bearing, the cap being bolted on as at 180. On the extension 179 is a ring 181 adapted to receive a funnel 182 located beneath the orifice 75 to receive the falling gob of glass and direct it, as will be shown, into the mold. The funnel 182 may be removable from the projection for replacement by another one, perhaps of different shape.

The sleeve 175, at its outer end, has formed integrally therewith a segmental gear 183 (Fig. 24). This gear meshes with a gear 184 fixed to a shaft 185 journaled in the bracket 177, to the other end of which shaft is fixed a gear 186. This latter gear meshes with a reciprocating rack 187 mounted on a slide 188 held in runners 189 on the frame 175. On this slide is mounted a cam roller 190 engageable with the cam 191 keyed to the shaft 65. Thus as the cam 191 rotates, the slide 188 reciprocates, causing, through the medium of the gears described, limited rotation of the shaft 172.

A flanged sleeve or spool 192 is secured to the shaft 172 by a set screw as shown in Fig. 29. Between the flanges of the spool 192 there fits a forked arm 193, which arm is a part of a vertical slide 194. This slide reciprocates on the frame 175 in suitable runways 195. A bell crank lever 196 rotatable on a shaft 197, that is secured to the frame, has a ball and socket connection 198 with a slide 194. The other arm of the bell crank 196 has a ball and socket connection 199 with a slide 200 supported in suitable runners 201 (Fig. 45) on the frame 170. A cam roller 202 is rotatably mounted on the slide 200 and engages with the cam 203 for actuation thereby. This cam is keyed to the shaft 65. Thus, rotation of the cam 203, by virtue of the slides and bell crank, lifts the shaft 172 a predetermined distance and then returns it. It will be understood that the spool 192 is rotatable relative to the arm 193 to permit oscillation of the shaft 172 by the segment 183.

A bracket 205 has a clamping sleeve 206 at the inner end thereof and embracing the shaft 172. This clamping sleeve is split for expansion and adjustment along the shaft, but may be bound against the shaft by a screw 207 drawing the split portions together. The outer end of the bracket 205 includes the blow down head 208 of the mold generally indicated at 209. A detailed description of the mold will be given hereafter. It will be understood, however, that it occupies the position shown in Fig. 2 during the molding operation and in this position the ware is inverted. It may be seen that the lifting or elevation of shaft 172 lifts the blow head 208 off the mold, after which rotation of this shaft by the segment 183 shifts the blow head to one side, so that the glass from the funnel 182 may drop into the open top of the mold. It may further be observed at this point that the adjustment provided by the sleeve 206 permits the use of this blow head with molds of various heights. Thus the blow head may be elevated to the position shown in dotted lines in Fig. 2, for use with taller molds.

Since the glass in the mold is formed so that the ultimate ware is upside down, it is necessary to turn the mold over to discharge the glass therefrom onto the table of the elements C of the mechanism. The mold assembly is supported on a turnover 215 having a projecting table 216 thereon. This turnover 215 in turn is mounted on a flange 217, by means as the screw attachment 218, the flange 217 being an integral part of a turnover shaft 219. This shaft 219 is rotatable in a long bearing 220 formed in the frame 170. To the end of the shaft 219 opposite the flange 217 there is secured a helical gear 221, the gear being held against rotation relative to the shaft by a key 222 and secured to the shaft by a countersunk nut 223 engaging over an extension of the shaft. A hollow cross 224 (Fig. 25) has helical racks 225 thereon, as shown, to mesh with the gear 221. This member 224 likewise has the cutouts 226 and 227 therein, and its ends opposite the racks are held rigidly together by a block 228 that is given sufficient length to provide stability to the member. At its free end, the member rides upon a shelf 229 in the main housing 62. A wheel 230, having opposite flanges 231 and 232, is provided with a roller 233 revoluble about a shaft 234 extending between the flanges 231 and 232. This wheel 230 is mounted on the shaft 65 and rotates therewith by virtue of a key 235.

The hollow cross 224 is principally supported by being held between the flanges of the wheel 230. As this wheel is rotated with the shaft 65, the roller 233 will periodically enter the slot 227 and, while therein, will engage against the outer edge thereof to move the cross member to the right, in Fig. 25. A corner 236 is followed by a cutaway portion and the location of this corner determines the time at which the motion of the cross ceases and the dwell begins. After the roller, in its rotation, leaves this corner 236 further outward motion of the member 224 will cease until the roller enters the slot 226. By engagement in this latter slot, the roller 233 will advance the member 224 inwardly to the position shown in dotted lines until it is free from the shoulder 237. The member 224 will then dwell until the roller again engages the slot 227.

By virtue of the engagement of the helical racks 225 with the gear 221, the latter gear and the turnover shaft 219 will successively be rotated 180°, will dwell a period in the rotated position, will then be rotated backward to the starting position, and will dwell in this starting position until repetition of the operation begins. The cycle takes place during each rotation of the shaft 65.

On the outer face of the turnover 215 is a slide 238 held onto the turnover by the track 239 shown in Fig. 25. At one end, this slide has a bifurcated element 241 secured thereto. A spring 242, held in suitable cutout portions of the slide and the table 215, acts against a ledge at the end of the slide opposite element 241 and urges the bifurcated element 241 against the turnover 215. When the previously described helical rack mechanism rotates, the shaft 219 thus in turn rotates the turnover 215 one-half a revolution, bringing the bifurcated element 241 into position where it engages over a tooth 243 on one arm of the bell crank 244 mounted on a shaft 245 that in turn is supported upon the frame 170. The opposite end of this bell crank has a ball and socket connection 246 with a slide 247 mounted in tracks 248 (Fig. 50) of the frame 170. A cam roller 249 is mounted upon the inner end of the slide 247 and is engaged by a cam 250 keyed upon the shaft 65.

The vertical slide 238 carries at its lower end a pair of spaced sleeves 251 and 252. An ear member 253 adapted to fit within the sleeve 251, and an ear member 254 adapted to fit within the sleeve 252, are oppositely internally threaded to receive a turnbuckle 255 having means thereon to receive a spanner wrench whereby it may be adjusted. The ear members 253 and 254 have thereon spaced pairs of ears 256 and 257, respectively. Between the ears 256 is fitted a link 258 pivotedly held by a stud shaft 259. The link 258, at its other end, fits between ears 260 on a crank arm 261 and is supported therein by a pin 262 (Fig. 19). This crank arm 261 is keyed to a shaft 263 that is mounted in spaced bearings that are formed in projections 264 and 265, that extend laterally and downwardly from the turnover table 216. Keyed to the shaft 263, between the projections 264 and 265, is an arm 266 that has a ball and socket connection 267 with one-half of the mold, for purposes to be described.

Corresponding to the aforementioned structure, there extends from between the ears 257 a link 270, pivotedly held between the ears by a shaft 271. This link is likewise fitted between opposed ears 272 on a crank arm 273 by means of a pin 274. The crank arm 273 is keyed to a shaft 275 supported between projections 276 and 277 extending laterally and downwardly from the turnover table 216. Keyed to the shaft 275 and extending between the projections 276 and 277 is an arm 278 that has a ball and socket connection 279 with the other half of the mold to be described.

At this point, it is enough to say that the two halves of the mold are separable for removal of the ware therefrom after its completion (Fig. 50). Therefore, after the turnover is effected and the bifurcated element 241 engages with the tooth 243, the slide 247 is reciprocated which causes the tooth 243 to move downwardly carrying with it the slide 240. This movement, in turn through the sleeves 251 and 252, is imparted to the toggle mechanism including the links 258 and 270 so that ultimately the arms 266 and 278 are moved outwardly, separating the two halves of the mold, as shown in Figs. 45 and 50. As has been pointed out, the ear members 253 and 254 float in the sleeves 251 and 252. By this means, any inequalities between the two halves of the mold are entirely compensated, and they will be moved together regardless of whether one-half may slightly override the center line or not. Manifestly, adjustment of this movement may be obtained through the turnbuckle 255.

Figure 17:
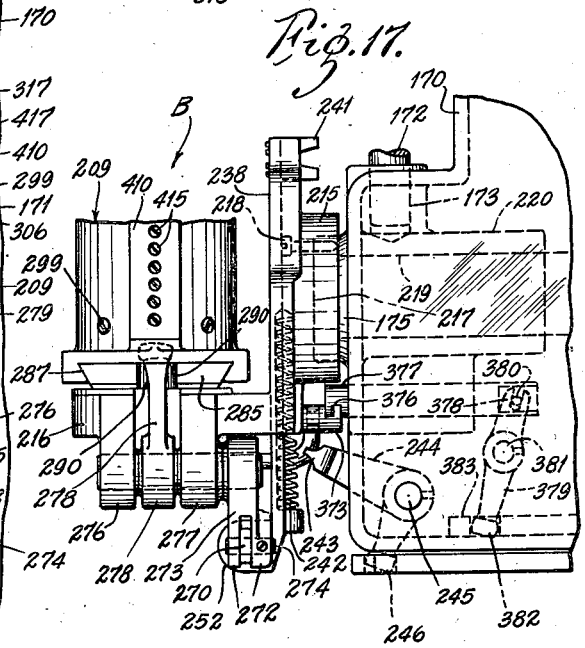
Fig. 17 is an elevation of the lower part of the forming mechanism.

The mold 209 is supported generally on the table 216. A plate 285 is secured to the table 216 by means of screws 286 (Fig. 17). This plate is dovetailed at 287 to receive the mold sections, as will be explained, and forms a slide upon which the sections reciprocate as they are opened and closed. Extensions 288 and 289 are provided to receive the mold sections in their open position, as shown in Fig. 50. Each of the extensions is provided with a cutout 290 to receive the crank arms 266 and 278 (Fig. 22).

The mold, as has been noted, is formed in two halves. One-half is generally indicated at 292 and the other half at 293. Each half includes an outer shell and an inner section, the outer shell of section 292 being shown at 294 and the inner section at 295. The outer section of half 293 is designated 296 and the inner section 297. The two sections are entirely symmetrical, so that a description of one is adequate for both. It will be observed that a slight space 298 is left between the meeting edges of the outer sections 294 and 296, but that the inner sections 295 and 297 close tightly together. The inner and outer sections are secured together by screws 299. Referring to the half 292, then, there is provided the inside cutout 306 shaped to the form of the ware to be made. It is shown related to a small-mouthed bottle with the finish at the bottom. A removable insert 307 is provided in each section to constitute the particular mold for this finish, and it is removable so that different styles of finish, such as cork or screw top, may be used.

In the particular instance, the screw top finish is provided. These inserts 307 are semi-circular and each has a flange 308 therearound that is somewhat less than 180° in extent. The inner portions 295 and 297 are provided with cutouts 309 (Fig. 23) into which may fit screws 310 to engage with the end of the flanges 308, whereby the inserts may be held in place. Of course, the main diametrical faces of the two inserts will come together to make a close fit. On the plate 285, there is provided an upstanding boss 311 that extends up beneath the two inserts 307 and likewise fits between semi-circular cutouts 312 in the two halves of the molds. By this means, as the two halves are brought together, they are centered.

It will be understood that the gob of glass severed from the mass in the feeder by the shears is guided by the funnel 182 so that it drops into the closed mold, resting beneath the funnel. At this time, the blow down head 208 is out of position over the top of the mold. Immediately after the gob has fallen into the mold, the blow down head is shifted over and down onto the top of the mold by the motion previously described. The details of this blow down head may now be given.

This head includes a cap 315 on the outer end of the arm 205. It receives an upper boss 316 integral with the head proper 317 and the boss is held therein by a screw 318 extending down through the top of the cap 315. The head 317 has a tapered flange 319 that engages over corresponding tapered projections on the top of the two inner sections 295 and 297 of the mold. Thus, the downward pressure of the head binds the two halves of the mold tightly together at the top. The head 317 has an inner face 320 shaped to cooperate with the portions 306 of the mold sections to form the bottom of the ware.

Figure 16:
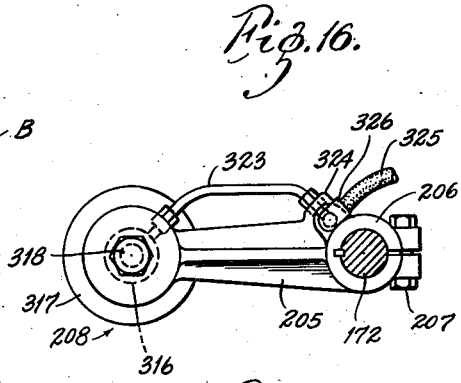
Fig. 16 is a plan of the blow down head taken on the line 16—16 of Fig. 2.

The boss 316 is circular, as shown, and fits closely within the inner walls of the cap 315. Intermediate the extremities of the boss is an annular cutout 321 (Fig. 21) that registers with the inlet 322 (Fig. 21) connecting to an airline 323 that, at its other end, extends through a lug 324 (Fig. 16) adjacent the sleeve of the arm 205. A flexible conduit 325 is connected to this lug 324 by means of a fitting 326 and, at its other end, goes into the valve box, as will be described.

The annular passage 321 in the head, by means of radial passages 327, communicates with an inner bore 328 within the boss. This inner bore at the bottom of the head 317 terminates in a valve seat 329.

A member 330 is fitted closely within the bore 328 and is provided with axial passageways 331 therethrough. It likewise has a central bore 332 in which is fitted a valve stem 333 terminating in a valve head 334, the head being flush with the surface 320 when the valve is closed. A screw 335 has a head overhanging the member 330 to limit the movement of the valve. This may be adjusted upon removal of the screw 318.

By means of the above, as soon as the blow down head is seated firmly over the mold, air is admitted through the line 323 and ultimately presses against the valve head 334, unseating it; after which it escapes into the mold to force the glass down therein to make the finish. As will be explained, pressure of the blow back reseats the valve 334.

Returning to the lower portion of the mold, it will be seen that in the table 216, there is a central bore 345 connecting with an enlarged bore 346 at the upper part of the table. A valve mechanism is located within these two bores. This valve mechanism includes a central valve body 347 having an annular passage 348 therearound. This passage communicates with axial passages 349 that extend from the passage 348 to the top of the valve body.

Surrounding the valve body 347 in the larger bore 346 is a cup-like element 350 in which is fitted a complementary element 351. The member 351 has an upper extension 352 thereon constituting the plunger element employed in making the finish. A central passage 353 extends through the member 351, and plunger 352 to receive the valve body 347, and at its upper end, this opening terminates in a valve seat 354. The member 351 is seated in a suitable opening in the mold support slide 285 wherein it forms a close fit. The member 351 overhangs the cup-like member 350 and rests on a shoulder thereon. The two are held together by a set screw 355. It will be seen that the cup-shaped member 350 is permitted a limited movement vertically in the opening 346. In the slide 285 ports are provided to prevent entrapped air from retarding motion of the member 351 therein, as shown in Fig. 20. A valve member 356 has its stem fitted into a central bore in the valve body 347, wherein it may be adjusted and held in position by a set screw 357. At its upper end, the valve 356 has a head 358 cooperating with the valve seat 354 on the member 351. The valve body is immovably supported in the bore 345 of the table 216 by means of a cap screw 359. To open the valve, the cup-shaped member 350 is lowered in the bore 346 and this correspondingly draws the valve seat 354 down away from the immovable valve head 358.

Extending through the table 216 is a passage 360 (Fig. 19) that terminates adjacent the annular cutout 348 of the valve body. An air line 361 connects to this passage. Further details of this air line will be given hereafter.

As shown in Figs. 2 and 35, screws 365 project from the bottom of the cup member 350 to beneath the table 216. A spring 366 surrounds each screw 365 within a cavity provided for it, and acts upwardly against the member 350 to urge the latter always into closed position. When the heads of the screws 365 strike the member 216 further upward movement of the member 350 is prevented.

The means for lowering the valve seat 354 includes structure now to be described. The cup-shaped member 350 is provided with tracks 370 on opposite sides thereof. The longitudinal contour of these tracks is shown in Figs. 2 and 35. In the table 216 and aligned with the tracks 370 are two bores 371 adapted to receive the arms 372 that extend from a crosshead 373, and to prevent vertical movement thereof. Each of these arms is provided with a roller 374 so situated as to engage in the tracks 370. Thus, upon reciprocation of the crosshead 373, the rollers will travel in the tracks 370 to raise or lower the valve seat. As shown in Fig. 35, outward movement, to the left, lifts the valve seat.

Figure 18:
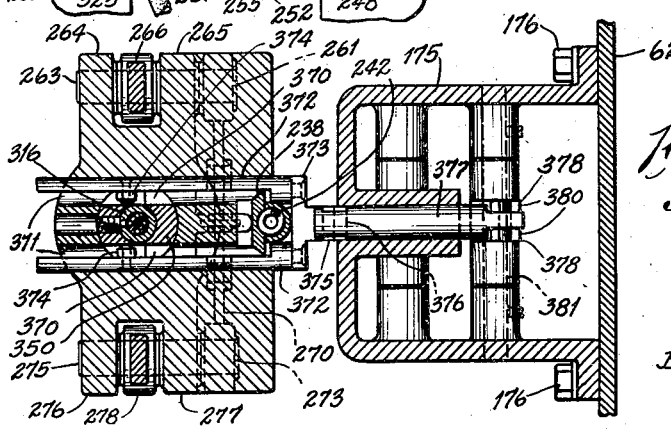
Fig. 18 is a section on the line 18—18 of Fig. 2, showing the blow back valve actuating means.

The outer end of the crosshead 373 has upstanding therefrom a hook 375 that may engage with a complementary slot 376 in a plunger 377. The slot 376 may be of greater axial extent than the hook 375 to provide a certain amount of lost motion. The plunger 377, at its opposite end, engages between slotted bifurcations 378 of a lever 379, there being a pin 380 in the plunger 377 engageable in the slots. The lever 379 oscillates on a shaft 381 journaled in the frame 175 as appears in Fig. 18. At its opposite end, the lever 379 engages by means of a ball and socket connection 382, with a slide 383 duly guided on the frame 175. A cam roller 384 is mounted upon the slide and engages with a cam 385 mounted on the shaft 65. Thus, when the turnover and mold are in an upright position, as shown in Fig. 2, the hook 375 will engage in the slot 376. Consequently, when the cam 385 reciprocates the slide this motion will be transmitted to the arm 372 and, by virtue of the engagement of the rollers 374 in the tracks 370, the valve seat 353 will be raised or lowered. Inward movement of the arms 372 toward the shaft 65 lowers the valve seat to open the valve. When the mold is overturned by the turnover, the hook 375 will pass laterally from the slot 376, to return when the mold is re-righted.

Referring back to the air line 361, this air line extends into the vertical portion of the turnover 215, as shown at 390 (Fig. 31). This passage 390 extends vertically within the member 215 to a horizontal passage 391 (Fig. 32) with which communicates a smaller horizontal passage 392. Within the passage 392 is located a plug 393 having a passage 394 therethrough. A headed screw 395, having a bore 396 communicating wtih the passage 394, is threaded into the inner end of the plug 393, the head of the screw being adapted to seat against the shoulder between the passage 391 and the passage 392 to prevent removal of the plug. At its other end, the plug 393 is provided with a head 397 rounded at its outer edge as is shown. Beneath the head is a shoulder 398, and surrounding the plug beneath the shoulder is a coil spring 399 seated in a space provided therefor, as shown. The spring normally maintains the plug outwardly from the member 215. A removable plug 400 closes the passage 391 and, upon its removal, access is had to the screw 395.

In the frame 175 adjacent the outer end of the bearing 220 in which is supported the turnover shaft 219, there is provided a flat 401 (Fig. 33). This flat has therein a port 402 to which an air line 403 is connected. This port 402 is so located as to be coaxial with the port 394 in the plug 393 supported in the turnover table 215 when said table is in the upright position of Fig. 2. The port 402 is of such size as to receive the rounded head 397, and seat the same, whereby to form a sealing connection between the air line 403 and the port 394; but the seal may nevertheless be readily made and broken by movement of the table. The movement of the plug 393 by its spring insures a good seal regardless of variations in the ports 394 and 402.

Referring back to the mold sections 292 and 293 each of the outer shells is provided with an extension 410 that comprises a water manifold, a vertical bore or header 411 extending downwardly from the top of these extensions substantially to the bottom of the mold. Extending inwardly from the header 411 is a series of horizontal passages 412. The passages 412 extend inwardly to the inner surface of the shell. Within the inner members, whether 295 or 297 since they are symmetrical, are a series of horizontal slots 413. These slots register between the two mold halves when the mold is together. They are spaced a certain distance apart vertically for reasons to be described. Their width, that is to say their extent inwardly toward the axis of the mold, varies with certain conditions also to be described. However, it may be noted, for illustrative purposes, that certain of these slots, such as 414 adjacent the shoulder of the bottle, extend inwardly further than do others.

Each of the passages 412 is individually controlled by an adjustable valve 415 that seats upon a valve seat 416 at the entrance of the passages 412. The amount of flow into the several slots 413, therefore, may be individually regulated by adjustment of the particular valve 415 that controls the slot being adjusted. Since the spaces 298 are provided between the outer sections, these spaces 413 and 414 exhaust to the air through said spaces 298.

Water is directed into the headers 411 through flexible tubes 417. The tubes 417 lead over to the upright portion of the turnover 215 (Fig. 31), and are connected into outlets therein. These outlets in turn communicate with radially disposed passages 418 within the member 215. The two passages 418 extend to the port 419 in the turnover table 215, the port being aligned with the axis of the shaft 219. An axial passage 420 extends through the shaft 219 and registers with the port 419. At the other end of the shaft 219 there is provided a swing joint connection. This includes a swinging element 421 (Fig. 26) mounted within an enlarged opening 422 in the shaft 219. A packing gland having packing 423 and a packing nut 424 is likewise mounted in the opening 422. The member 421 is thus rotatably sealed in this opening. It has a central passage 425 registering with the passage 420 in the shaft 219. A block 426 is secured by a set screw 427 over the projecting end of the element 421. It has a passage 428 at right angles to the passage 425, and into this passage is brought water, by means of a line 429 leading from a suitable and controllable water supply. The water circulation system is shown diagrammatically in Fig. 30. Any suitable valve in the water line may be employed to admit water in proper quantity to the line 429. It is further valved at the mold, as above described. When the machine is completely inoperative, the water is cut off, but it may flow constantly throughout the cycle herein described, and it becomes steam at the mold, passing therefrom through slots 298 when the mold is closed, or exhausting at the mold edges when the mold is open.

The mechanism for controlling the air lines to the molds includes a valve assembly 440 (Figs. 3 and 38). The valve structure includes a valve body 441 extending outwardly from the main housing 62, wherein is located the valve chamber to be described. It is attached to the housing 62 by bolts 442. A bracket 443 extends through an opening into the main housing 62. Upon this bracket is formed a bearing 444.

A cam shaft 445 is mounted between a lateral extension 446 at the outer end of the body and a corresponding extension 447 at the inner end of the body. An opposite cam shaft 448 is mounted between an extension 449 and an extension 450. On the end of the shaft 445, inside the housing 62, is fixed a gear 451. A corresponding gear 452 is mounted on the shaft 448 and both the gears 451 and 452 mesh with a driving gear 453, that is mounted on the end of a shaft 454 supported within the bearing 444. Secured to the outer end of the shaft 454 is a bevel gear 455 meshing with a bevel gear 456 that is secured to the main shaft 65. Consequently, upon rotation of the main shaft, the two cam shafts 445 and 448 will be rotated in opposite directions.

The valve body 441 has mounted thereon a valve block 457, the block being attached by screws 458. Complementary cutouts 459 and 460 in the valve body 441 and valve block 457 form an air chamber 461. An air inlet 462 connecting to a suitable air supply leads into the air chamber. From this air chamber lead four valve passages 463 that terminate in lateral plug openings 464 that receive the valve plugs 465. From the opposite side of each valve plug 465 leads an outlet passage 466 communicating with a transverse passage 467. A main air outlet 468 is in communication with the passage 467 through a valve seat 469. An adjustable needle valve 470 is threaded into the passage 467 and projects adjacent the seat 469 to limit the amount of air that may pass from the passage 466 to the main outlet 468. From the innermost limit of the main outlet 468 extends a small exhaust passage 472 that terminates at the plug opening 464. On the opposite side of the plug opening a passage 473, adapted to be communicated with passage 472, exhausts to atmosphere.

The valve plug 465 has therein an annular passageway 474 and also suitable sealing means 475. As will be understood, the valve plug reciprocates to two positions. In one of these positions, namely, the pressure position, the annular passageway 474 communicates with the passages 463 and 466 whereby air may pass from the air chamber 461 through the valve 469 and into the main outlet 468. In the exhaust position, the plug seals off passages 463 and 466, but puts the exhaust passages 472 and 473 in registry through the annular passage 474.

At its outer end, the valve plug 465 is provided with opposed indentations 476 and 477. For each plug, are two rollers 478 and 479, the rollers being located on opposite sides of the plug and adapted to register with either the indentations 476 or indentations 477. The rollers have studs 480 extending outwardly therefrom which studs are constrained to move within slots 481. Between opposite studs 480 of the rollers 478 and 479 are coil springs 482 that tend to draw the rollers together. By this means, a snap-action is provided, since whenever the crest between the indentations 476 and 477 is surmounted in the movement of the valve to one or the other of its two positions, the action of the springs on the rollers drawing them radially of the plug will advance the plug with the snap-action. As is shown, the rollers engage within the indentations 476 when the plug causes the annular passage 474 to register with the exhaust passages and when the rollers engage in the indentations 477 the annular passage will put the inlet passages 463 and 466 into registry. As is evident, the slots 481 are cut in extensions 483 on the valve block 457. The valves are moved to their two positions by cams on the shafts 445 and 448.

Referring to Fig. 38, the several valves are designated at 485, 486, 487 and 488. Valve 485 is actuated by cam 489 on shaft 445 and cam 490 on shaft 448. Similarly valve 486 is actuated by cams 491 and 492; valve 487 by cams 493 and 494; and valve 488 by cams 495 and 496. The cam faces are designed to obtain the actions described hereinafter, and each cam is individually adjustable on its shaft and held by a set screw 497.

The blow down line 325 extending from the blow head 208, as has been described, extends into the valve 485. Valves 486, 487, and 488, respectively, control lines 498, 499 and 500. These three lines are brought together in a manifold 501 (Fig. 63) from which leads the line 403 into the turnover table.

That portion of the mechanism, designated as C, will now be described. This mechanism shows devices for receiving the ware from the mold when the latter is opened, for transporting the same to a location where it may be disposed upon the receiving elements for the lehr, and for discharging the ware onto the lehr receiving element.

Extending laterally from the main housing 62 is a hollow frame 520 shaped into a housing, it being supported on the main housing 62 by suitable bolts 521. An extension 522 on the frame 520 is drilled to receive a rod 523 over the top of which is rested a table 524, the table being preferably triangular as shown (Fig. 52). The rod 523 is adapted to reciprocate in the extension 522. To this end, it has a collar 525 secured to its bottom end. The collar is adjustable along the rod and may be secured in adjusted position by set screw 526. Projections 527 and 528 (Figs. 51 and 55) extend oppositely on the collar 525. A headed pivot 529 is secured in the projection 527 and a corresponding headed pivot 530 is secured in the projection 528, the pivots being held in place by tapered pins. A link 531 engages over the pivot 529 and a link 532 over the pivot 530. To these links are secured pivotably the arms 533 and 534, respectively. At their opposite ends, the two arms are respectively mounted on and for rotation with the stud shafts 535 and 536, these shafts being suitably journaled in opposite sides of the hollow frame 520. Within the frame on the two stud shafts 535 and 536 are segmental gears 537 and 538, respectively (Figs. 3 and 53). Idler gears 539 and 540 mounted on the sides of the frame 520 mesh respectively with the segments 537 and 538. They likewise mesh respectively with driving segmental gears 541 and 542 that are secured to a shaft 543 extending between the opposite sides of the frame 520. A lever 544 is keyed to the shaft 543, as shown in Fig. 53, so that upon oscillation of the lever the shaft 543 will follow the motion. At its end, remote from the shaft 543, the lever 544 has pivotal engagement with opposite links 545, the engagement being effected through a pivot 546. At their opposite ends, the links 545 are pivoted to an ear 547, the pivot being designated 548. The ear 547 is an integral upstanding portion of a table 549 adjustable upon a slide 550. The slide 550 has an extension 551 thereon through which extends an adjusting screw 552 that in turn is threaded into the table 549, as shown. Hence, adjustment of the screw 552 operates on the table 549 relative to the slide 550. A screw 553 engaging a suitable nut 554 is designed to hold the table 549 to its position to which it is adjusted by the screws 552. A T-shaped slot 555 is provided to accommodate for the adjustment.

The slide 550 is duly supported in tracks 556 on the frame 520 and carries at its inner end a cam roller 557 which cam roller is engageable with a cam 558 duly mounted on the shaft 65. Hence upon rotation of the cam 558, the slide 550 will be reciprocated and, through the links 545 and 544, the segments 541 and 542 will oscillate, which motion will be transmitted, as is clear from the preceding description, to the links 533 that in turn will lift the rod 523 and the table 524. The extent of this motion is so designed that the table, when lifted, will come up to position where it practically touches the true bottom of the mold after the same has been inverted. It will be noted that in the down position the links 545 are substantially vertical. Consequently, any adjustment of the screw 552 in this position produces no noticeable effect upon the rod 523 while in this down position. Therefore, the adjustment provides means for varying the upper position of the table 524 whereby to accommodate for ware of different types without changing the lower position of the table. To accommodate for any slight variation in the lower position of the rod 523, the table 524 may be free on the same to have slight up and down movement.

Just inside the extension 522 on the frame 520, there is journaled a sleeve 560. Rotatably supported within the sleeve 560 is a shaft 561. A collar 562 abuts against the lower face of the frame 520 to limit the upward position of the sleeve 560. This sleeve projects above the frame and has an oscillating plate 563 surrounding the projecting part of it. This plate 563 rotates with the sleeve 560 and rests against the frame 520 to hold the sleeve in position.

On the upper end of the shaft 561 is fastened a gear 564 that meshes with an idler 565 on the oscillating plate 563, that in turn meshes with a gear 566 that is mounted on a short shaft 567. This shaft 567 is journaled in a block 568 secured to the oscillating plate 563. At its upper end the shaft 567 supports a gear 569 that meshes with a rack 570. This rack is supported in a track 571 formed between a plate 572 and projections 573 on the top of the block 568. At its outer end, this rack carries a pusher bracket 575 that will be moved to engage the ware on the table 524 and slide the same from the table onto the moving member 576 that may be either the table of the lehr itself or a transmission means for conveying the ware into the lehr.

For rotating the shaft 561, the following means is provided. The shaft projects below the sleeve 560 and secured to this projection is a helical gear 578, the gear being keyed as at 579 to the shaft and held on by a suitable nut 580 (Fig. 54). Slidably mounted on the outside of the lower part of the sleeve 560 is a spool collar 581, this collar having an annular track 582 therein. On diametrical points of the lower skirt of the collar 581 are secured helical racks 583 and 584 that, for convenience, may be located between spaced ears on the collars, as is shown. These racks project downwardly through a torque block 585 and engage with the helical gear 578. The block 585 is keyed as at 586 to the sleeve 560. It has slots 587 and 588 to receive the racks 583 and 584, respectively. Plates 589 are secured to the opposite edges of the block to close the slots 587 and 588 so that the slots guide the racks and hold them in engagement with the helical gear 578. The block 585 is given a tight fit on the sleeve 560 and its key 586 prevents any rotation on the sleeve.

A bell crank arm 590 mounted for oscillation on a shaft 591 that extends between opposite sides of the frame 520 has a forked outer end 592. On each extension of the fork are pivoted blocks 593, as shown in Fig. 47, slidably engageable within the annular slot 582 on the collar 581. The opposite leg 594 of the bell crank 590 has a ball and socket connection 595 with a slide 596 mounted in suitable tracks on the frame 520. At its inner end the slide 596 has a cam roller 597 operable by a cam 598 mounted on the shaft 65.

Consequently, when the cam 598 rotates it reciprocates the slide 596 and oscillates the bell crank 590. If this oscillation is counterclockwise, referring to Fig. 3, the bell crank will carry the collar 581 downwardly to the position shown in Fig. 53. The downward movement of the collar forces the helical racks 583 and 584 down; and they in turn rotate the helical gear 578, which motion is ultimately transmitted through the top gears 564, etc., to the rack 570 which advances out over the table 524 to discharge the ware therefrom.

As may be seen from Figs. 57–59, it is desirable to have the ware discharged in a plurality of directions so that it may be distributed across the surface area of the member 576. Means now to be described have been provided to control the angular direction of movement of the rack 570 so that it either projects straight outwardly, as in Fig. 57, to one side as in Fig. 58, or to the other side as in Fig. 59. These means have been so designed to insure that the length of travel of the rack 570 produced in the manner just described will be the same whichever of the three angular directions the travel may be caused to take.

To this end a segmental gear 605 is secured to the oscillating table 563. This segmental gear is engaged by a rack 606 secured to a slide 607 mounted in suitable runners on the frame 520, as shown in Figs. 57–59. The slide 607 has at its inner end a cam roller 608 engageable with the cam 609. This cam is secured to a sleeve 610 rotatably mounted on the main shaft 65. Likewise secured to the sleeve 610 is a gear 611 that engages with a smaller gear 612 concentrically arranged with a larger gear 613, both being mounted on a shaft 614 extending between upper and lower walls 615 and 616 of the frame 520. The gear 613 meshes with the gear 617 keyed as at 618 to the main shaft 65.

By this means as the shaft 65 rotates, the cam 609 will rotate but at a slower speed because of the reduction gearing just described. The cam 609 is so designed that if the position of Fig. 57 is considered as the starting position it will move the slide 607 outwardly and by engagement of this slide with the segmental gear 605 will shift the oscillating plate 563 to the position shown in Fig. 58. It will subsequently return the slide 607 rotating the segment 605 so that the rack will extend in the direction of Fig. 59. Following this, it will return the oscillating table to the position of Fig. 57.

In this movement of the oscillating table, the entire mechanism for advancing the rack 570 is rotated. The sleeve 560 rotates with the table 563 carrying with it the block 585. This block by its engagement with the racks 583 and 584 draws them around and with them the spool 581. Movement of the spool 581 does not affect the position of the bell crank 590 because of the connection with the latter through the annular slot 582. Since the bell crank 590 will be maintained in its original position by the cam 598 the racks 583 will be prevented from moving either upwardly or downwardly. Consequently, there can be no incidental rotation of the helical gear 578 relative to the racks since any such motion necessarily requires movement of the rack. Therefore, when, subsequently, movement of the bell crank 590 takes place, it will commence from its original starting position and will ultimate in precisely the predetermined amount of movement of the rack 570 regardless of what position the oscillating table 563 has been caused to assume.

The means for operating the main shaft 65 includes the aforementioned motor 64. This motor, through reducing gearing 625, drives a shaft 626 journaled as at 627 and 628 in the base. This shaft 626 carries a worm gear 629 that meshes with a gear 630 rotatably mounted on a shaft 631. The shaft 631 is journaled as at 632 in the base and extends at right angles to the shaft 626.

The shaft 631 has a reduced outer portion to which is keyed a worm gear 633 that meshes with a driving gear 634 secured to the shaft 65. A clutch connection selectively engages the gear 630 with the shaft 631 so that the motion of the motor is transmitted to the shaft 65. To this end the gear 630 is provided with a projection 635 having clutch notches 636 therein. A clutch collar 637 has complementary splines adapted to engage in the clutch notches 636. The clutch collar 637 is mounted on a sleeve 638 and rotates therewith by key means 639. This sleeve in turn is keyed as at 640 to the shaft 631 and a set screw 641 is provided to prevent axial movement of the sleeve 638 along the shaft.

To maintain this clutch in engagement, the following mechanism is provided. The shaft 631 is hollow as at 642. A block 643 is slidably mounted within the bore 642. A pin 644 extends between the block 643 and the clutch collar 637, the pin passing through slots 645 in the sleeve 638 and slots 646 in the shaft 631. A spring 647 acts against the block 643 to force it to the left, in Fig. 66, whereby correspondingly to force the clutch collar 637 into engagement with the gear 630. Normally this clutch, therefore, is closed.

The clutch provides means for manually driving the shaft 65. A crank 648 may be fitted into the bore 642 of the shaft 631. This crank is of such length that it forces the block 643 to the right disengaging the collar 637 from the gear 630, thus freeing the motor from the shaft. The crank, likewise, has a pin 649 engageable in a bayonet slot 650 by means of which the shaft 631 may be rotated when thus freed from the motor.

In order to illustrate the type of cam used on the drive shaft, reference is made to Figs. 10–14. Each cam comprises a disc 660 keyed to the shaft as at 661 and having a set screw 662 to prevent sliding of the cam along the shaft. Thus the cam may be adjusted to its proper elevation for engagement with its respective cam roller and maintained in such position by its set screw 662. The key slots on the shaft are of limited length, to provide a gauge for locating the cams, as will be described. Two annular grooves are located in the cam disc 660, one of these 663 being termed an "out" groove and the other 664 being termed an "in" groove. As shown in Fig. 11, these grooves are T-slotted. Riding in each groove is a pair of threaded collars 665, there being holes 666 in the two grooves whereby these collars may be inserted. The cam elements comprise two duly formed members, such as the "out" element 667 having a driving face 668 thereon, and the "in" member 669 having a driving face 670 thereon. Screws 671 extend through suitable holes in the cam elements and are threaded into the collars 665. As shown in Fig. 10, the roller, indicated in dotted lines, travels between the working faces of the cam elements. It will, of course, be understood that while each of the cam discs is the same, the several cam elements are designed to obtain the proper motion for the individual mechanism operated thereby and to obtain the proper timed relation of such motion. The cam elements may be located at suitable points around the periphery of the cam disc and this feature provides an additional form of adjustment for the entire device.

The operation of the mechanism is as follows:

A general description of the operation of the several mechanisms will be given before details of their adjustments are discussed. It is assumed, therefore, at the outset that the mechanisms are all properly set up and timed. It is, furthermore, to be assumed that the proper amount of liquid glass is located within the forehearth 74 ready to be treated. Power is supplied to the motor 64. The clutch mechanism is permitted to engage so that the main shaft 65 rotates. The cam 92 is caused to rotate operating the slide 89, the crank 84 and the arm 79 to reciprocate the piston 71. The piston will first rise forcing air into the feeder air bell and causing a gob of glass to be extruded from the orifice 75 of the forehearth 74 and suspended therebeneath. At this time the shear blades 129 and 130 are separated. After the glass has been extruded, the piston 71 will dwell in the top position and then will be retracted. The retraction, in accordance with the well-known properties of such feeders, causes the glass to neck-in or become extenuated adjacent the orifice. As soon as the glass is thus necked-in, the cam 164 will operate the slide 162 turning the shaft 109 to close the shears and sever the gob at the necked-in portion. The shears will quickly return under the cam action into the opened position, where they will remain until a subsequent gob is extruded.

At this time, the blow down head 208 is off the mold and to one side, leaving the mold open at its top. The severed gob of glass will drop through the funnel 182 and will thereby, if necessary, be contracted until its outer dimension is to a slight degree less than the internal dimension of the mold. The gob is then directed into the mold and falls to the bottom thereof, its reduced size permitting the escape of air around it so that its descent inside the mold is unrestricted by impounded air. At the instant the glass is entirely within the mold, the slide 188 moves inwardly causing the shaft 185 to rotate the arm 205 and the blow down head 208 into alignment with the mold. Following this movement, very quickly the slide 200 will be forced outwardly by the cam 203 and the blow down head 208 will be forced quickly and solidly down onto the mold. The cams 191 and 203 will hold the slides 188 and 200 to dwell in this closed position until the blowing operations are completed.

At the instant the blow down head becomes seated, the valve shaft 445 will have rotated the cam 489 to open the valve 485 and admit air into the line 325. This air will pass through the connection 324 and the line 323 into the passage 321 and thence through the passages 331. By its pressure, it will unseat the valve 334 from the valve seat 329 and, this pressure being relatively high, will force the entire gob of glass downwardly within the mold until it is pressed into the finish-forming portion and over the plunger 352. The finish will thus be formed. Almost simultaneously with the action of the valve 485, and immediately upon its being closed by the cam 490, the valve 486 will be opened and air will be admitted by way of the line 498 and the line 403 into the outlet 402 (Fig. 34) on the turnover frame 175. At this time, the turnover is in upright position, so that the plug 397 is seated within the outlet 402 whereupon the air from the line 403 flows through the passage 394 within the plug 397 and ultimately out the line 361 and into the passage 360 on the mold table. From this passage, it flows upwardly beneath the valve 358 seated on the valve seat 354.

As this occurs, the cam 385 moves outwardly the slide 383 which, through the lever 379, reciprocates the rods 372 and ultimately lowers the cup-shaped member 350 and with it the valve seat member 351, thus opening the valve 358. The air valve 486 (Figs. 38 and 63) remains open only for an instant in this case, and admits only a brief puff of air into the gob, this being done for two reasons: the first is that it gives a start for the later blow back; the second is that it commences the blow back immediately after the blow down has occurred. There is no dwell, therefore, of the blown down glass before the blow back occurs. If the glass, after the blow down, remains for any length of time in this position, the top of the mass being in contact with the mold and furnishing an edge that may readily and to a large degree cool, may have formed thereon a mark commonly known in the art as a highwater mark. This initial puff of air by valve 486 avoids the highwater mark by preventing the dwell of this edge of glass against the mold. The valve 358 will remain open, however, although the valve 486 closes almost instantly. The recession of the plunger 352 is essential because after the finish is formed, it may contract and the plunger would obstruct this. If after recession, the plunger were again forced up, it might shatter the finish.

As soon as these operations have taken place, the glass consists of a mass with the finish properly formed thereon, the entire body of the glass being forced down into the lower part of the mold, principally on the shoulders thereof, but with a small bubble adjacent the finish.

Immediately following the operations thus far described, the valve 487 is opened by its cam, the valve 486 now being closed. This admits air through the line 499, the manifold 501 and again through the line 403. This air travels out the valve 358 and slowly, relative to the other air actions, enters the gob and forces it to extend out until it fills the mold. Finally after the mold is practically entirely filled by this last action, the valve 487 closes and the valve 488 opens to permit a sudden surge of air through the line 499 and into the mold, forcing the glass up against the bottom plate 320 to form the bottom of the ware. The purpose of these stages of blowing will be explained hereafter in connection with the description of the method.

At this time, a determined quantity of water will be admitted through the line 429 into the swivel block 426, through the passage 420 on the turnover shaft, out the two lines 418 in the turnover 215 and thence by way of the lines 417 into the water manifolds of the mold halves. From these two manifolds, the water extends into the horizontal slots 413 of the mold, the quantity being determined by the settings of the several valves 415. It may be said at this point, that this quantity is varied along the height of the mold. This is to obtain a particular cooling of the glass, as will be described in connection with the method. As soon as the water strikes the mold it becomes steam, and may escape through the slots 298. It is understood that raw steam, or other cooling media could be used in place of water.

As soon as this molding operation is completed, and the various air valves are cut off, the two slides 188 and 200 will be operated by their cams to lift the blow down head 208 and shift it to one side. Immediately thereafter, the wheel cam 230 will cause its roller 233 to engage in the slot 226 to move the cross 224 toward the mold, thereby to rotate the gear 221 and turn the mold upside down. As this takes place, two operations simultaneously occur. The cam 558 (Fig. 3) will force the slide 550 outwardly, drawing the link 545 with it. Through the gearing 541, 539 and 537, this will move the arms 533 and 534 upwardly to lift the table 524 until it is in its upward position, shown in Fig. 45. Meanwhile, the slide 247 will be moved by the cam 250 inwardly, moving the bell crank 244 counterclockwise, as shown in Fig. 2 and also in Fig. 45. At this time, with the turnover having the mold in its upside down position, the tooth 243 will be located between the prongs of the bifurcated element 241, as shown in Fig. 45, so that this movement of the bell crank 244 will move the slide 238 downwardly, moving the sleeves 251 and 252 therewith, thus throwing the toggle mechanism off center and spreading the arms 266 and 278 of Fig. 19 to the position shown in Fig. 50. These arms 266 and 278 will slide the mold halves apart. At the instant this occurs, the table 524 is designed to be immediately below the mold to receive the ware that will be released therefrom. The ware, therefore, rests in upright position upon the table 524, and shown in Fig. 45. This table, then is lowered rapidly but smoothly to its bottom position, the mold thereupon being again closed and returned to its upright position by the cam mechanism etc. described. The blow down head, however, remains off of it, so that it may receive the subsequent gob.

The downward travel of the table 524 comes to rest evenly since, at the end of this travel, the movement is automatically slowed up due to the fact that at the end of its travel, the slide 550 provides very little movement of the link 545, the latter being substantially in vertical position. With the ware thus lowered, the cam 598 then operates the slide 596 to move the bell crank 590 and lower the racks 583 and 584. This movement turns the gear 578 which ultimately moves the rack discharge 570 outwardly across the table 524. It may be assumed that, in this operation, the ware was pushed straight out as shown in Fig. 57. The ware is thus discharged onto the lehr table 576 or to a conveyor leading to the lehr. Before the next complete operation of ware forming by the machine, the gearing 617, 613, 612 and 611 will have rotated the cam 609 into such position that the slide 607 with its rack 606 will have advanced outwardly moving the segment 605 and the oscillating table 563, until the rack 570 is directed into a side position, as shown in Fig. 58. Before the third complete operation, the aforementioned mechanism will have been completely withdrawn so that the slide 570 stands in the position of Fig. 59. Of course, the number of positions may vary and depends upon the design of the gearing 611, etc., and the cam 609. After the position of Fig. 59, the mechanism returns to the position of Fig. 57.

Thus the general operation of the mechanism may be understood. It is not believed necessary to show specifically each of the cams mounted on the main shaft. Their general construction is that shown in Figs. 10–14, and it is believed that with the description given, the particular contours of the cam elements 667 and 669 may be understood.

In assembling the device, the back plate 63 is removed. The shaft 65 with the cams thereon, they being approximately located by their key slots along the shaft, is inserted in the bottom bearing 67 and then into the several cap bearings 66, after which the caps of the latter are fastened in place. The shear assembly, the mold assembly, and the take-out assembly may be located onto the main housing before or after the shaft is put in place, and may be individually installed or removed. The shaft, however, is removable without disturbing these several elements. The back plate 63 is then put in place and fastened.

In setting up the shear mechanism, the screw 97 is adjusted until the shear blades are out far enough to come properly beneath the orifice 75. This adjustment will necessitate a proper coordination of the cam 164 after it is made. The screws 101 and 102 are released and then adjusted until the shear blades are positioned laterally properly beneath the orifice, with proper allowance for displacement of the gob by the shear action When this adjustment is obtained, both screws are brought against the stud 112 to hold the adjustment. The nut 105 may then be turned until the proper elevation of the shears is obtained, after which the elevation may be secured by tightening the screw 107.

The mass of glass extruded depends upon the amount of air forced into the feeder bell and this, in turn, depends upon the stroke of the piston 71. This stroke may be varied by adjusting the screw 86 to permit a predetermined movement of the crank 87 by the slide 88 before contact of the screw with the table 81, and consequent movement of the arm 79 and the piston, thus leaving only a portion of the slide movement to be transmitted to the piston. The lowermost position of the piston is determined by adjustment of the set screw 83. The correlation between the screws 83 and 86 determines the dwell of the piston in both its upper and lower positions, the purposes for which are well known in the art.

Where it is desired to alter the time relation between the shearing operation and the feeding operation, for purposes understood in the art, the cam elements of either the cam 91 or the cam 164 may be moved peripherally about the cam, so as to advance or retard the one with respect to the other.

Concerning the mold and turnover assembly, it first must be noted that different sizes or heights of molds may be used. Additional mold units, having the similar members 370 for installation into the turnover table 216, may be installed by removal of the screws 365, whereupon the old mold unit may be taken from the table and the new one installed.

The blow down head 208 will have the bottom plate 317 therein of such size as to fit the mold being used. A new bottom plate may be substituted by removing the screw 318, and then the old head and valve assembly; inserting the new bottom plate 317 into the head, and securing the same by the screw 318. It is, of course, understood that all the bottom plates have extensions 316 of the same size and design, and each its valve assembly.

If the new mold is of a different height than the former one, the screw 207 may be loosened and the sleeve 206 adjusted along the shaft 177 until the head 208 is in the proper elevation for the new mold, such as is shown in dotted lines in Fig. 2. The travel of the blow head 208 may be adjusted by altering the face of the cam elements on the cams 191 and 203 and proper timed relation is obtained by the peripheral positions of these cam elements relative to the various other cams.

The opening of the mold sections is controlled by the turnbuckle 255. As has been noted, the toggle action here is floating. By this means, while a certain amount of motion is produced and while normally it is equally divided between the two mold sections, nevertehless, overtravel of one and undertravel of the other is automatically compensated.

It is believed that the adjustment of the valves 333 and 358 is clear from the previous description. It is also clear from the previous description that different inserts 301 can be used to obtain different types of finish.

The adjustment of the valves in the valve box 440 should be clear from the previous discussion. The valve-operating cams are independently adjustable about their shafts, so as to obtain proper timed relation. Likewise, the return cams are independently adjustable, so that the dwells of the valves in one position or the other may be separately controlled. The force of the air admitted through ony of the valves is controlled by the setting of the needles 470, as is evident.

The length of stroke of the take-out table 524 is determined by the adjustment of the screw 552 on the slide 550. As has been noted, when the table is in its lowest position, the link 545 is vertical. Consequently, the adjustment of the screw 552 produces no appreciable effect on this lowest position. To accommodate for any slight variations that may be produced, the table 524 is not fixedly attached to the rod 523 and will rest upon the extension 522 when in its lowest position to permit any necessary further slight movement of the rod 523. Further coordination may be obtained by adjusting the sleeve 525 on the rod 523.

In every instance, the cam elements may be adjusted about the peripheries of the cams, in order to obtain the proper timed relation.

In obtaining this timed relation, it will be desirable to turn the main shaft 65 by hand. To do this, the crank 648 is inserted disengaging the clutch connecting the motor with the shaft and subsequent rotation of the crank will operate the main shaft.

The several mechanisms thus operate in timed relation, their relative times and periods of operation being controlled by the adjustments described. The machine provides a feeder, shears, complete forming means, ware take-out, ware discharge means all mechanically operated from a single main shaft. Ordinarily the turn-over is taken as the starting point for phase or synchronism adjustments, and the remaining mechanisms coordinated with and from this.

The method of the present invention will now be described. This method involves two phases: the first is the overall timing of the means to process the glass in successive and defined stages from the feeding step through the lehr discharge step. While the method is adapted to other molds than the present, it finds particular application in connection with the present molding method which, of itself, forms the second phase of the process feature of the invention.

Considering the general sequence of operations, this method involves the following steps: namely, feed, shear, ware forming, ware take-out, and ware discharge. Specifically, the method comprises the operation of these several steps from a single shaft by mechanical timing control means individually adjustable and located one above the other, so that the entire process can be obtained in a compact and relatively simple machine.

In this method, the molten glass is suitably located within the forehearth or furnace, it being understood that ordinary forehearths are used; but, in the present discussion, the term is intended to relate to the furnace or a particular part thereof containing an orifice. The first step comprises ejecting from the forehearth a gob of glass to be suspended from a vertical orifice therein; the second step comprises severing this gob from the mass within the forehearth in due synchronism with the extruding operation; the third step includes directing the gob toward an open mold and simultaneously, slightly reducing its diameter, or insuring that its diameter may be within a given limit, so that it can drop unobstructed to the bottom of the mold; and the fourth step includes closing the mold, providing the blow down and blow back in a single operation by the method to be described more in particular hereinafter. After the forming is completed, the process continues to reopen the top of the mold, invert the same simultaneously to bring a receiving table beneath the inverted mold and then open the mold so that the formed ware may be deposited upon the receiving table, after which the receiving table removes the ware and bears it downwardly. The mold proper is then returned to its upright position and the sections closed to receive a new charge. The formed ware is then finally thrust off of the table automatically onto the lehr receiving means.

The method includes the relationship in time of the several steps and their operation by mechanical connections from a main shaft, preferably vertical. It may be seen that this method embodies the successive steps of processing glass, with adjustable timing of any step relative to the others.

The forming method incorporates principles deduced from the preliminary explanation given heretofore. This method involves controlling the various factors effecting the heat dissipation of the glass during molding. In this method, as previously described, the gob of glass falls into the mold and settled at the bottom thereof. By the action of the guide ring, the gob is made slightly smaller than the inside dimensions of the mold, so that air beneath the gob may escape around it. Immediately the blow down head is closed tightly on top of the mold and compressed air is admitted through the medium of the control valves described, which forces the gob of glass down into the mold so as to form the finish. Necessarily the glass is thereby in contact with the relatively cold and consequently heat-absorbing walls of the mold a sensible period of time. It fills only the lower part of the mold up to a given elevation on the sides thereof. During this time, the contact of the glass with the mold causes a penetration of the cooling produced by the relatively cool walls of the mold up so far as the glass extends therein. The upper edge of this glass can dissipate somewhat more heat into the mold than can the surface areas of glass below it, for it can discharge its heat into the adjacent walls of the mold immediately above, that otherwise are not required to absorb large quantities of heat. Consequently the penetration at this edge is deeper, and the set of the glass greater. If this is not compensated, there will result a "high water mark" on the completed ware.

The next step of the process overcomes this effect. In this step, a short puff of air is discharged in through the finish which causes the glass to be inflated slightly, and the upper edge to be elevated a short distance. By this means the production of the so-called "high water mark" on the glass is overcome. Then, as has been described, a full charge of air is admitted through the finish which causes the inner and molten part of the glass to roll up along the sides of the mold in the manner described at the outset of the specification, leaving that part initially cooled to form the lower sides of the object. Specifically, these lower sides include the shoulder of the bottle described. As the glass thus rolls out extending up the sides of the mold, it cools by contact therewith, and the penetration of this coolness, produced by the walls of the mold, is a function of the time a given part of the glass remains in contact therewith. Therefore, as one factor, the time period of application of this charge of air is so determined that, relative to the temperatures of the mold walls, the penetration into the upper walls of glass becomes substantially the same as that of the lower walls, the latter having been produced beginning with the blow down. This second charge of air is relatively slow.

Finally, there is a quick final charge of air injected into the ware through the finish which forces the last part of the glass against the bottom plate, that actually is the top of the mold, forming the bottom of the ware and giving a complete bottle.

Thus in the method so far described, four charges of air have been admitted. The first is the blow down; the second is the small high water mark eliminator; the third is the slow blow back; and the fourth is the final bottom forming blow back. Each of these is timed, both as to its own duration and its time relation with the others, so as to cooperate with the other controlled features, to obtain uniform penetration throughout the ware, and, consequently, uniform thickness of the walls of the bottle. Therefore, the order and the time duration of the several air charges comprise one phase or one factor of the novel method.

The foregoing presupposes, however, certain conditions in regard to the heat dissipation capacities of the mold. Therefore, the present method includes also control of these heat dissipation characteristics. It has been shown that these involve the mass of metal available at a given point to absorb heat. Thus, in Fig. 19, if the slots 413 and 414 be omitted, there will be a greater mass of metal adjacent the shoulder and neck of the bottle than at the top. Consequently, this metal can absorb more heat than that at the top and the penetration of the less ductile glass will extend deeper at the shoulder and neck than at the remaining parts of the bottle. It is desirable that the penetration be complete at the finish, in order that this part may promptly be put into final shape and set. However, excess glass at the shoulders will be caused, if the heat dissipation thereat is not controlled (and as a matter of fact, reduced) relative to that of the remaining upper parts of the mold.

Although a mold could be made up, and has been done by the inventor, wherein the mass of metal was so proportioned throughout the length of the ware as to obtain relatively little penetration adjacent the shoulders and relatively great penetration upwardly therefrom toward the top of the mold, nevertheless, it is preferable that more flexible means be provided to this end. Wherefore, the water cooling means, previously described, is used. Since the glass at the blow down, necessarily, is in contact with the mold longer than any other part, the heat dissipation must be reduced at this point. Therefore, the slots 414 extend inwardly further than do the others, thereby to reduce the amount of metal adjacent the shoulder. The water entering at 417 turns to steam upon reaching the mold and is caused to fill all of the slots. This steam absorbs heat from the mold to cool it and increases the penetration factor. The valves controlling the slots 414 will be closed to admit only a small quantity of steam into the slots. Hence these slots will act more as small air insulators than as cooling means. This same will be true up to the predetermined high water mark or top of the gob after the blow down.

It is necessary, however, to obtain more rapid dissipation of heat for that part of the mold contacting with the glass on the blow back. Therefore, extending upwardly from the high water mark, the valves 415 will be opened in increasing amounts, so that the steam in the passages 413 may absorb more heat from the mold in amounts increasing toward the top thereof. By this means, the penetration is decelerated adjacent the shoulder of the bottle and up to the high water mark, since this part of the glass is first and longest in contact with the mold. Obviously that glass ultimately blown back to the top of the mold forming the bottom of the bottle is shortest in contact with the mold, so that in order to obtain uniformity of penetration the heat dissipation at the top of the mold must be accelerated, as is accomplished herein.

The several slots 413 and 414 also restrict vertical heat interchange from the several parts of the mold, so that the temperature may be more accurately controlled.

In the foregoing description of the method, a further factor has been included. The blow back is based upon holding of the glass in the mold at the finish. A large amount of metal is present adjacent the finish, which causes it to be frozen, or set, quickly. However, it must not be frozen to such an extent that it will be full of internal stresses that may cause it to shatter or crack during or subsequent to the forming operation. The slots 413 and 414 as described provide for sufficient heat dissipation to accomplish this result. Their retarding of vertical heat transfer within the mold walls prevents the heat given off at the finish into the walls from being conducted upwardly to overcool the walls at the finish.

In this method, the entire forming operation takes place in a very short time. There are no dwells, no plurality of forming stages, and no transfer of the glass from one mold to another, all of which introduce heat dissipation of varying and uncontrollable degrees. Each step in the present method follows directly, with no delay, after the last. By this speed of operation, and by the control of heat dissipation in the manner described, uniform or controlled distribution is obtained. In the blow back step, the action follows that described at the outset. A predetermined and uniform penetration is obtained at the blow down. This uniformity is preserved in the blow back, completely avoiding the unequal penetration inevitable where a suspended mass is inflated and contacts at certain points of the mold sooner and longer than at others.

By the aforegoing method, uniformity of wall thickness of the ware is obtained in vertical as well as horizontal cross-section. In exceptional cases, the uniformity in horizontal cross-section of the ware may be insured by varying the horizontal shape of the several slots 413. This may be done in any case, but is not necessary except in unusual cases. The slots are varied horizontally to provide increased cooling where decreased penetration might occur, and decreased cooling where increased penetration might occur.

After the blowing is completed, and the ware is in final form, the blow down head is lifted and the mold inverted, as previously described, and then opened to permit the ware to be removed. The ware at this time will be sufficiently set, so as to hold its shape, as it rests on the table.

This single operation of forming the ware makes possible the simple glass making method disclosed herein. It becomes possible to operate from a single power means, the series of mechanisms from feeder to lehr discharge, all connected to the power means by direct, fully controllable, mechanical connections.

Wherefore it may be seen that the invention provides a forming method, and in addition a glass fabricating method made particularly possible by incorporating the forming method. It likewise contemplates a simple compact machine, capable of performing the overall method, and incorporating the most desirable apparatus for performing the forming method.

What is claimed is:

1. In a method of making hollow glassware, the coordinated, successive steps of ejecting a gob of glass from an orifice, severing said gob adjacent the orifice, receiving said gob in a mold, separately controlling the heat dissipation from the glass in different parts of the mold successively engaged by the glass, and obtaining thereby a desired penetration, bringing the glass to the shape of completed hollow ware in said mold, and then discharging said ware from said mold.

2. In a method of automatically making hollow glassware, the coordinated, successive steps of ejecting a gob of glass from an orifice severing said gob adjacent said orifice, receiving said gob in a mold, separately controlling the heat dissipation from the glass in different parts of the mold successively engaged by the glass, and obtaining thereby a desired penetration, bringing the glass to the shape of completed hollow ware in said mold, blowing down the gob in the mold, blowing back the glass in the mold while controlling the heat dissipation therein in such wise that one piece of ware is formed completely in a single mold, opening the mold and simultaneously presenting a movable table beneath the open mold to receive the ware, withdrawing the table bearing the ware, and reclosing the mold.

3. In a method of automatically making glassware, the steps of ejecting a gob of glass from an orifice, severing said gob adjacent the orifice, receiving the gob in a mold in the inverted position, forming said glass in said mold to completed ware while separately controlling heat dissipation from the glass in different parts of the mold successively engaged by the glass, turning said mold over, simultaneously opening said mold and presenting a ware receiving means immediately therebeneath, and thereby depositing said ware on said means, conveying said ware below the mold and clear of the same, forcing said ware from said receiving means, and finally returning mold to inverted position.

4. In a method of making glassware, the steps of receiving the glass in a mold, forcing the same down in the mold toward one end thereof, making one end of the ware completely, forming a starting cavity for the air, expanding this cavity by blowing the hot central portion upward, controlling the speed at which the central portion is forced upwardly, together with independently controlling the temperatures of the mold at various elevations to the end of dissipating the heat of the glass to a uniform depth in the upwardly moving portion and thereby obtaining a suitable distribution of all the glass in the forming of the ware.

5. In a method of making glassware, the steps of receiving a mass of glass in a mold, forcing the glass into one end of the mold to apply thereto the contour of such part of the ware, forcing back a part of the glass into the other parts of the mold to hollow the glass and to form the other part of the ware, and regulating the temperatures of the parts of the mold so that the rate of heat dissipation from the glass effected by the mold is less at the first part of the mold than at the second, to the end of controlling the thickness of the walls of the ware.

6. In a method of making glassware, the steps of receiving a mass of glass in a mold, forcing the glass into one end of the mold to apply thereto the contour of such part of the ware, forcing back a part of the glass into the other parts of the mold to hollow the glass and form the other part of the ware, controlling the heat dissipation capacity of the first part of the mold whereby to control the penetration factor of the glass therein, and increasing the heat dissipation capacity of the other parts of the mold relative to said first part, whereby to obtain more rapid penetration in the other parts of the ware during formation, to the end of obtaining controlled thickness of the walls of the ware.

7. In a method of making glassware, the steps of receiving a mass of glass in a mold, forcing the mass into one end of the mold to apply thereto the contour of such part of the ware, blowing back by compressed air applied beneath the surface of the forced down glass, a part thereof to hollow the same and cause it to contact the remaining parts of the mold, and adjustably controlling the heat absorption capacities of the several parts of the mold so as to control the penetration factor of the glass therein and thereby to control the wall thicknesses of the ware.

8. In a method of making glassware, the steps of receiving a mass of glass in a mold, forcing the mass into one end of the mold to freeze an index onto the same in the form of the final ware, and to apply the contour of a first part of the mold to the glass, then forcing a part of the glass back into the remaining parts of the mold while holding the same at the index, and controlling the relative temperatures of the several parts of the mold successively engaged by the glass so that the index will be given sufficient set to hold during the back-forcing, the penetration at the first part of the glass will be maintained to a desired amount, and the speed of penetration at the remaining parts of the mold will be increased relative to said first part to the end of obtaining uniform thickness of the walls of the ware.

9. In a method of making glassware, the steps of receiving a mass of glass in a mold, forcing the mass into one end of the mold to apply thereto the contour of the corresponding part of the ware, forcing back a part of the glass to hollow the mass and contact the remainder of the walls of the mold, applying a heat-absorbing medium to the mold, and so distributing the heat-absorbing medium about the mold that the amount of heat absorbed from the various parts of the glass is made substantially uniform, thereby compensating for the otherwise greater absorption from those parts of the glass longer in contact with the mold, to the end of obtaining uniform distribution of the glass in the ware.

10. In a method of making glass, the steps of receiving a mass of glass in a mold, forcing the same into one end of the mold, forcing back a part of the glass into the remaining parts of the mold, and simultaneously hollowing the same, controlling the relative heat dissipation capacities of various cross-sectional strata of the mold so that uniform heat dissipation from the glass will obtain, thus compensating for the inequalities of time the various parts of the glass contact the mold, and retarding longitudinal transmission of heat within the mold.

11. A method of making glassware, including the steps of receiving a mass of glass in a mold, blowing the same into one end of the mold, immediately starting a blow back by a small puff of air applied into the blow down mass, applying a long puff of air to complete the blow back to hollow the glass and to cause it to fill the entire mold, controlling the temperatures of the several parts of the mold, and controlling the speed of the blowing stages, so that the heat dissipation from the glass longer in contact with the mold and that shorter in contact with the mold are caused to be substantially uniform.

12. In a glass machine, a frame, a shaft thereon, power means for driving said shaft, a shear mounted on the frame, a forming means mounted on the frame to receive the glass from the shear, said forming means including separable mold sections, an invertible turn-table upon which they are mounted, means to maintain the mold in glass receiving position and to invert it, means to separate the sections when the mold is inverted, and relatively adjustable driving means connecting said shear and said forming means to said shaft to be driven in timed relation thereby to sever glass to be received by the mold, and thereafter to invert the mold and separate its sections.

13. In a glass machine, a frame, a vertical driven shaft thereon, shear means on the frame, forming means on the frame below the shear, ware take-out means on the frame below the forming means, and mechanical mechanisms connecting each means to the shaft, said shaft being removable from the frame without removal of the means, and each means being individually removable without removal of the shaft or any of the other means.

14. In a glass machine, a frame, power-driven means thereon, shear means, a forming means on the frame including a mold to receive glass from the shear means, means for shaping the glass in the mold to final ware therein, means to open the mold, ware take-out means movable to adjacent the mold to receive the ware therefrom and remove the same from the mold, and mechanisms for connecting each of said means to said power-driven means to be operated in timed relation thereby.

15. In a glass machine, a frame, a power-driven device thereon, a mold on the frame, means to open the mold, a ware take-out table movable from an initial position to receive ware from the mold and returnable to remove the ware, and means to discharge the ware from said take-out table, together with mechanisms connecting the several means and the table to the power-driven device, said mechanisms automatically causing the mold to open and simultaneously moving the take-out table to adjacent the mold, and then returning the take-out table, and finally operating the discharge means to remove the ware received from the mold from the ware take-out.

16. In a glass machine, a frame, power-driven means on the frame, a forming means on the frame, a ware take-out means movable from a starting position to a position to receive ware from the forming means, and to return with the ware, ware discharge means movable across the take-out means in its initial position to remove the ware therefrom, and mechanisms connecting the several means to the power-driven means for operation thereby.

17. In a glass machine, a frame, a forming mechanism including a mold, means mounting the mold on the frame in a position to receive a mass of substantially unformed glass, force-down means and force-back means combined with the mold, together with means controlling the heat dissipation characteristics of the mold to obtain controlled distribution of the glass in the mold, whereby to form the ware complete in a single mold, means to invert the mold, and means to open the same to discharge the ware therefrom, ware take-out means mounted on the frame for movement from an initial position to a position to receive ware from the mold in upright position, and return, and means to move said take-out means to receiving position simultaneously with the opening of the mold.

18. In a glass machine, shear means, forming means mounted below the shear means and movable from a position to receive unformed glass from the shear means into a position to discharge completely formed glass, a ware receiving means movable to a position to receive the completed ware in upright position, and means in said mold variably controlling the heat transfer characteristics between the several portions thereof to obtain uniform distribution of the glass being formed therein, whereby to shape the unformed glass from the shear into completed form to be received upon the ware receiving means.

19. In a glass machine, a mold adapted to receive glass, means operable to cause the glass to be forced into one section of the mold, means operable to cause part of the glass to be returned into other sections of the the mold, and means to increase the heat-transfer characteristics of said other sections of the mold relative to the one section whereby to compensate for the greater heat transfer into said one section caused by longer time of contact of the glass therewith, and means to vary the speed of the forcing back of the glass.

20. In a glass machine, a mold adapted to receive glass, means operable to cause the glass to be forced into a first end of the mold, and means at said first end of the mold to form an index on the ware for further operations, means operable to cause a part of the glass to be forced back into the second end of the mold while holding it by said index, and means conducting a cooling medium through the sections of the mold in such wise as to have increased heat absorption from the glass in the second end of the mold to compensate for greater duration of contact of the glass in the first end thereof.

21. In a glass machine, a mold adapted to receive glass, means operable to cause the glass to be forced into a first end of the mold, means operable to cause a part of the glass to be expanded into the second end of the mold, and means to conduct a heat-transfer medium to at least part of the mold to counteract the differences in heat dissipation in the glass caused by unequal periods of time the glass is in contact with the different parts of the mold, and means to vary the speed of the operation of the expanding means.

22. In a glass machine, a mold adapted to receive glass, means operable to cause the glass to be forced into said mold with certain parts of the glass contacting the walls of the mold longer than do other parts, means to conduct a heat-transfer medium about the walls of the mold including a series of passages, means to control the flow of said medium through said passages to adjust the heat-transfer of the several parts of the mold, and means to vary the intervals of contact of the glass and the several portions of the mold walls.

23. In a glass machine, power-driven means, a mold open at one end to receive glass, a head for said mold, means operable to cause the glass to be forced into the closed end of the mold, means operable to cause a part of the glass to be expanded into the other end of the mold toward said head, means in said mold to compensate for greater heat dissipation from the glass longer in contact with the mold relative to that shorter in contact, and means to operate from said power-driven means said head to close the mold, said first force means, and said second force means in the order named.

24. In a glass machine, shears, a mold open at one end and disposed to receive glass from the shears, a head movable to close the said end of the mold, means controlling air pressure operable to cause said pressure to blow the glass into one end of the mold, means controlling air pressure operable to cause said pressure to expand part of the glass into the other end of the mold, means to balance the heat dissipation from the glass in the two ends of the mold, and means connecting the shears, the movable head, the blow down control, and the expand control to cause said shears to operate, said head to cover the mold, said blow down control to operate, and said expanding control to operate in timed relation in the order named, whereby to form completed ware in one mold.

25. In a glass machine, a frame, power-driven means on said frame, a mold table, a mold thereon, movable ware take-out means, means to conduct a heat-transfer medium to the table from the frame, means to open the mold, and means connecting said power-driven means to said table to overturn the same with the mold, to said mold opening means to cause same to open the mold, and to said ware take-out means to cause the same to move adjacent the mold as it opens to receive the ware therefrom.

26. In a glass machine, a frame, power-driven means, a mold table rotatably mounted on said frame, a mold on said table, said mold comprising two sections, means on said table to separate the sections, operating means on the frame to connect the separating means to the power-driven means, said separating means and said operating means being automatically engaged upon rotation of the mold to ware discharge position.

27. In a glass machine, a frame, a mold table, a sectional mold on the table, said table being rotatably mounted on the frame, power-driven means, means to separate the mold sections, means always connected to said power-driven means to cause said table to rotate to inverted position and back to upright position with a dwell at each position, and means connecting said mold section separating means to said power-driven means when said mold table dwells in inverted position.

28. In a glass machine, a frame, power-driven means, a mold table rotatably mounted on the frame, separable mold sections movably mounted on the table, a fluid conduit extending through the axis of said table, flexible tubes connecting said conduit with said mold sections to maintain the connection in all positions of the sections, a swivel connector on said table connecting said conduit to a fluid source, means to rotate the table to upright position and to inverted position with a dwell in each position, and means connecting said power-driven means with said mold sections when the table is inverted to separate the same.

29. In a glass machine, a frame, a mold table, a mold on said table, a valve fixedly mounted in said mold, a plunger surrounding the valve and movably mounted in said mold and having a valve seat to cooperate with said valve, means operable to cause glass to be forced onto said plunger, and means to withdraw said plunger from the valve and admit air to said glass to force the same back in the mold.

30. In a glass machine, a frame, a power-driven means, a mold on said frame, a valve fixedly mounted at one end of the mold, a plunger movably mounted in the mold and having a valve seat to cooperate with said valve, a master valve having lines communicating with said mold valve, means operable for causing the glass to be forced down over the plunger and controlled from said power means, means operated from said power means to withdraw the plunger after the glass is forced onto same and to open the valve thereat, and means operated from said power-driven means to cause said master valve to admit a series of air charges through said mold valve.

31. In a glass machine, a frame, power-driven means in the frame, a mold movably mounted on the frame, a head for said mold, a blow down line in said head, a blow back valve in said mold, a master valve means including a plurality of individual valves, mounted on said frame and actuated from said power-driven means, one of said individual valves controlling said blow down line, and others selectively in series with said blow back valve, said master valve means first operating the blow down line, means for opening said blow back valve operated from said power-driven means subsequently to operation of said blow down, said master valve means then successively admitting a series of charges of air through said blow back valve to complete the ware, and means operated from said power driven means subsequently to the above operations, to invert said mold.

32. In a glass machine, a frame, power-driven means, shears on said frame, forming means mounted on said frame beneath the shears, means for adjusting the shears horizontally and vertically on the frame, a guide element below the shears and above the forming means, said forming means including elements movable to cause operation of means to effect shaping of the glass by the forming means, means connecting said shears to said power-driven means and said forming means to said power-driven means for actuation in timed relation to each other.

33. In a method of making hollow glassware, the steps of ejecting a supply of glass for a mold, severing said supply synchronously with the ejection thereof, receiving the glass in a mold, separately controlling the heat dissipation from the glass in different parts of the mold successively engaged by the glass, and obtaining thereby a desired penetration, bringing the glass to the shape of completed hollow ware in said mold, shaping the glass in said mold to final form in coordinated sequence with the severance, while controlling the heat dissipation from the glass into the mold, and then in coordinated sequence discharging said ware from the mold.

34. In a method of making glassware, the steps of receiving glass in a mold, forcing the glass down into one end of the mold, thereafter forcing the glass back up in the mold while applying to various zones of the mold successively away from the aforesaid end thereof a heat controlling medium in such wise as to dissipate heat relatively more rapidly from said successive zones, and regulating the speed of the force-back relative to the heat dissipating capacities of said several zones so that a desired penetration distribution may be obtained in the glass finally molded.

35. In a glass machine, a frame, a shaft on the frame, a shear mechanism on the frame, a forming means, means mounting the forming means on the frame for movement from glass receiving position to discharging position, including a pivoted support in line with which the forming means is mounted, and means connecting the shear mechanism and the forming means to the shaft for operation thereof in timed relation, including pivoting of the forming means.

36. In a glass machine, a frame, a power mechanism thereon, shear means, a forming means including separable mold sections, a blow-down head, a blow-back means, means to govern the heat dissipation of the parts of the mold to enable the glass to be completely formed in the single mold, a ware take-out means movable into position beneath the mold, means to part the mold sections whereby the ware may rest on the take-out, and be withdrawn thereby, and means to operate said several means in timed relation from the power mechanism.

37. In a glass machine, a frame, a forming means rotatably mounted on the frame from a glass receiving position to a glass discharging position, and means to vary the heat dissipation characteristics of different parts of the mold, means to cause the glass to expand in the mold at such rates as to provide equal penetration factor therein, and to provide finished ware in said mold, means for opening the mold, a ware receiving table movable from an initial position to a position beneath the mold whereby to receive the ware from the mold in upright position, and to convey it from the mold, and mechanism operating the several means in timed relation to cause the forming means to shape the glass, to overturn, to open, and simultaneously with the opening to cause the ware receiving table to move beneath the mold and receive the ware therefrom, and then convey the ware from the mold.

38. In a glass machine for hollow ware, mold means mounted below the shear means and movable from position to receive unformed glass to position to discharge completely formed glass, means to control the heat dissipation characteristics of different parts of the mold, means operable to cause the glass to be forced into the bottom of the mold in its initial position, to form the top of the ware, means operable to cause the glass thereafter to be expanded into the remainder of the mold, at a speed adjusted to the heat dissipation characteristics of the mold so as to obtain desired wall thickness of the glass, and to make completed ware in a single mold, means to overturn the mold, ware receiving means movable to a position beneath the overturned mold, and means to open the mold to release the ware to the receiving means.

39. In a glass machine, a frame, a series of vertically arranged fabricating devices on the frame, a vertical shaft on the frame, said devices including a means to cause glass to be fed from a feeder, a shearing means below the feeder, a forming means movable from position to receive unformed glass to position to release molded glass, together with means to move the same, said molding means being below the shearing means, a take-out means below the forming means and movable to position to receive glass from the forming means, and thereafter to position apart from the forming means, and means to discharge the glass from said take-out, together with means connecting each device to the shaft for operation thereby in timed relation.

40. In a glass machine, a mold adapted to receive glass, means providing a plurality of passages around the mold, means to conduct a temperature controlling medium to said passages at a plurality of points therein, and means to conduct said medium from said passages.

41. In a glass machine, a mold adapted to receive glass, means providing a plurality of passages around the mold, means to conduct a temperature controlling medium to each of said passages at a plurality of points therein, and means to control the flow of such medium to each passage individually.

42. In a glass machine, a mold comprising a plurality of separable sections, a plurality of passages in said sections to receive a heat controlling medium, said mold sections sealing together, but having exhaust passages at the junctions of the sections to permit egress of said medium.

43. In a glass machine, a mold comprising a plurality of sections, said sections longitudinally dividing the mold, a plurality of transverse passages in the sections to receive a heat controlling medium, a manifold attached to each section to receive and distribute said medium to said passages, and means to exhaust said passages.

44. In a method of making hollow glassware, the steps of receiving a relatively unformed mass of molten glass in a mold, forcing the mass of glass down into the mold to form a portion thereof, forcing the glass back in the mold, controlling the heat dissipation from the glass as it contacts successive portions of the mold, including forcing it back at such a speed relative to the heat absorption qualities of the said successive portions of the mold, including the first portion into which the glass is forced down, and the other portions into which it is forced back, as to obtain walls of predetermined thickness throughout.

45. In a method of making glassware, the steps of receiving the glass in a mold, forcing the glass into one portion of the mold, hollowing the glass and forcing it back in the mold to fill the other portions thereof, controlling the heat dissipation from the glass as it contacts successive portions of the mold, including varying the speed of the forcing back relative to the heat absorption qualities of the said successive portions of the mold so that the heat dissipation into the mold may assume a desired predetermined characteristic, to provide ware of controlled wall thickness throughout.

GEORGE ROESSLER.